(12) United States Patent
Kittaka et al.

(10) Patent No.: US 11,293,527 B2
(45) Date of Patent: Apr. 5, 2022

(54) VEHICLE POWER UNIT

(71) Applicant: HONDA MOTOR CO., LTD., Tokyo (JP)

(72) Inventors: Eiji Kittaka, Wako (JP); Takashi Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 349 days.

(21) Appl. No.: 16/370,158

(22) Filed: Mar. 29, 2019

(65) Prior Publication Data

US 2019/0309828 A1 Oct. 10, 2019

(30) Foreign Application Priority Data

Apr. 5, 2018 (JP) .............................. JP2018-072917

(51) Int. Cl.
*F16H 3/22* (2006.01)
*F16H 3/089* (2006.01)
*F16H 63/32* (2006.01)
*F16H 63/18* (2006.01)

(52) U.S. Cl.
CPC .............. *F16H 3/22* (2013.01); *F16H 3/089* (2013.01); *F16H 63/32* (2013.01); *F16H 63/18* (2013.01); *F16H 2063/322* (2013.01)

(58) Field of Classification Search
CPC . F16H 3/22; F16H 3/089; F16H 63/18; F16H 63/32; F16H 2063/322
USPC ...................................................... 74/337.5
See application file for complete search history.

(56) References Cited

U.S. PATENT DOCUMENTS

| | | | |
|---|---|---|---|
| 6,370,976 B1* | 4/2002 | Doppling | F16H 63/18 74/337.5 |
| 7,963,183 B2* | 6/2011 | Pick | F16H 63/48 74/337 |
| 8,056,669 B2* | 11/2011 | Ogasawara | F16D 21/06 180/293 |
| 10,711,891 B2* | 7/2020 | Hasegawa | B62M 11/06 |
| 2002/0121831 A1* | 9/2002 | Egawa | H02K 1/24 310/216.001 |
| 2009/0170658 A1* | 7/2009 | Ogasawara | F16H 61/0009 477/127 |

(Continued)

FOREIGN PATENT DOCUMENTS

| | | |
|---|---|---|
| JP | 10-038037 A | 2/1998 |
| JP | 2011-073591 A | 4/2011 |

(Continued)

*Primary Examiner* — William C Joyce
(74) *Attorney, Agent, or Firm* — Carrier Blackman & Associates, P.C.; William D. Blackman; Joseph P. Carrier

(57) ABSTRACT

A vehicle power unit has a transmission apparatus including a transmission, and a transmission actuating mechanism including a speed reduction gear train having multiple speed reduction stages for transmitting power from a drive gear on a drive shaft of a shift motor to a driven gear on a drum turning shaft of a shift drum. The speed reduction gear train has a speed reduction ratio ranging from 23 to 45, and the shift motor is a DC electric motor that produces a pulsating cogging torque having a maximum value ranging from 0.04 to 0.07 Nm. The vehicle power unit enables the transmission actuating mechanism to be made up of a reduced number of parts and to be simple in structure, making the transmission apparatus small in size, and ensures quicker and smoother gear changes with an electric motor.

16 Claims, 11 Drawing Sheets

(56) References Cited

U.S. PATENT DOCUMENTS

| | | | |
|---|---|---|---|
| 2010/0072018 A1* | 3/2010 | Tsukada | F16D 21/06 192/48.611 |
| 2016/0281822 A1 | 9/2016 | Adachi et al. | |

FOREIGN PATENT DOCUMENTS

| | | |
|---|---|---|
| JP | 2011-208766 A | 10/2011 |
| JP | 2016-186357 A | 10/2016 |

* cited by examiner

VEHICLE POWER UNIT

TECHNICAL FIELD

The present invention relates to a vehicle power unit for use on a small-size vehicle.

BACKGROUND ART

Patent Document 1 discloses a vehicle power unit having a transmission apparatus supported integrally with an internal combustion engine on a crankcase. The transmission apparatus includes a transmission having gear pairs of different speed reduction ratios for transmitting power to the vehicle from the internal combustion engine and a transmission actuating mechanism having a shift drum angularly movable by a shift motor to move shift forks guided by the shift drum for changing gear pairs of the transmission to transmit power.

PRIOR ART DOCUMENT

Patent Document

[Patent Document 1]
JP 2016-186357 A

In the vehicle power unit disclosed in Patent Document 1, the crankcase has left and right side walls by which a crankshaft is rotatably supported to extend in leftward and rightward directions transversely across a vehicle body incorporating the vehicle power unit. The transmission has a main shaft and a countershaft that also extend in the leftward and rightward directions transversely across the vehicle body. The main shaft, the countershaft, and the shift drum of the transmission actuating mechanism are also rotatably supported by the left and right side walls of the crankcase.

A shift spindle extends through and is rotatably supported by the left and right side walls of the crankcase. A gear fitted on a left end portion of the shift spindle that extends through the left side wall of the crankcase is operatively coupled to a drive gear of the shift motor through a speed reduction gear mechanism.

A master arm is fitted over a right end portion of the shift spindle that extends through the right side wall of the crankcase. Swinging movement of the master arm is applied through an intermittent feed mechanism to angularly move the shift drum through predetermined angles.

For swinging movement of the shift drum, there is a stopper mechanism having a stopper roller pressed against the uneven cam surface of a star-shaped cam on the shaft of the shift drum. When the stopper roller is fitted in a concavity in the uneven cam surface, the shift drum is positioned in a certain angular position.

SUMMARY OF THE INVENTION

Underlying Problems to be Solved by the Invention

The transmission actuating mechanism disclosed in Patent Document 1 includes the speed reduction gear mechanism that is disposed on the left end of the shift spindle and the intermittent feed mechanism and the stopper mechanism that are disposed, together with the master arm, on the right end of the shift spindle. Therefore, installation spaces for these mechanisms are required on both left and right ends of the shift spindle, tending to enlarge the transmission apparatus in the leftward and rightward directions transversely across the vehicle body. Therefore, the vehicle power unit is relatively large in size, the transmission actuating mechanism is made up of a large number of parts, complex in structure, and highly costly to manufacture.

It has been desired in the art that the transmission actuating mechanism be able to make quicker and smoother gear changes with an electric motor.

The present invention has been made in view of the above problems. It is an object of the present invention to provide a vehicle power unit including a transmission actuating mechanism that is made up of a reduced number of parts, simple in structure, effective to prevent a transmission apparatus from being enlarged and hence make the transmission apparatus small in size, and able to make quicker and smoother gear changes with an electric motor.

Means to Solve the Problems

To achieve the above object, there is provided in accordance with the present invention a vehicle power unit having an internal combustion engine and a transmission apparatus that are integrally supported in a crankcase. The transmission apparatus includes a transmission having gear pairs of different speed reduction ratios for transmitting power from the internal combustion engine and a transmission actuating mechanism having a shift drum angularly movable by a shift motor to move shift forks guided by the shift drum for changing gear pairs of the transmission to transmit power. The vehicle power unit includes a speed reduction gear train having multiple speed reduction stages for transmitting power between a drive gear on a drive shaft of the shift motor and a driven gear on a drum turning shaft of the shift drum. The speed reduction gear train has a speed reduction ratio ranging from 23 to 45, and the shift motor includes a direct current motor that produces a pulsating cogging torque having a maximum value ranging from 0.04 to 0.07 Nm.

With this arrangement, in the vehicle power unit in which the transmission apparatus supported together with the internal combustion engine in the crankcase and disposed rearward of the internal combustion engine, the shift motor is a direct current electric motor that produces a pulsating cogging torque having a maximum value ranging from 0.04 to 0.07 Nm, the maximum value of the cogging torque is 0.04 Nm or larger, and the gear train for transmitting power to the shift drum has multiple speed reduction stages having a speed reduction ratio ranging from 23 to 45. The transmission actuating mechanism is able to brake the shift drum effectively with the cogging torque applied from the shift motor through the speed reduction gear train, minimizing an overshoot of the shift drum. The transmission actuating mechanism can stop the shift drum easily at desired angular positions in the absence of an intermittent feed mechanism. Accordingly, the transmission actuating mechanism can be made up of a reduced number of parts and simpler in structure, so that the transmission apparatus is prevented from being enlarged and the vehicle power unit is made small in size and less costly to manufacture.

In addition, as rotation of the shift motor is transmitted to the shift drum to angularly move the shift drum only through the speed reduction gear train, the transmission apparatus is capable of changing gear positions more quickly and smoothly with an electric motor.

The transmission actuating mechanism that is free of an intermittent feed mechanism is free of noise that would otherwise be caused by an intermittent feed mechanism in changing gear positions and hence does not require a soundproof structure.

Providing the speed reduction ratio of the speed reduction gear train is 23 or larger, the transmission actuating mechanism can stop the shift drum easily in a desired angular position in the absence of a stopper mechanism. As no stopper mechanism is included, the transmission apparatus is made smaller in size, making it possible to further reduce the size of the vehicle power unit.

If the speed reduction ratio of the speed reduction gear train exceeds 45, then since it takes time for the transmission gears to move, it is time-consuming to change gear positions, making it difficult for the dog clutches to mesh smoothly.

Therefore, the shift motor is required to be larger in size and higher in output power.

In the above arrangement, the vehicle power unit may be laterally mounted on a small-size vehicle with a crankshaft oriented in leftward and rightward directions transversely across the small-size vehicle; the shift drum may have left and right drum turning shafts rotatably supported respectively on left and right side walls of the crankcase; the driven gear may be mounted on one of the left and right drum turning shafts of the shift drum; the transmission actuating mechanism may include an extension support wall extending rearward from one, on which the one of the left and right drum turning shafts with the driven gear mounted thereon is rotatably supported, of the left and right side walls of the crankcase; the shift motor may be mounted on the extension support wall with the drive gear protrusively disposed in the leftward and rightward directions; and the speed reduction gear train may be supported on the extension support wall and arranged in an array.

With this arrangement, in the vehicle power unit laterally mounted on a small-size vehicle with the crankshaft oriented in the leftward and rightward directions transversely across the small-size vehicle, the extension support wall extends rearward from one of the left and right side walls of the crankcase, the one side walls rotatably supporting the one of the left and right drum turning shafts, the shift motor is mounted on the extension support wall with the drive gear protrusively disposed in the leftward and rightward directions, and the speed reduction gear train is supported on the extension support wall and arranged in an array. Consequently, the transmission actuating mechanism is placed all together on one of the side walls and the extension support wall, so that the transmission apparatus is prevented from being enlarged and the vehicle power unit is made small in size.

In the above arrangement, the shift motor may be mounted on a rear portion of the extension support wall with the drive gear protrusively disposed in one of the leftward and rightward directions which is the same as the direction in which the one of the left and right drum turning shafts with the driven gear mounted thereon extends.

With this arrangement, since the shift motor is mounted on the rear portion of the extension support wall with the drive gear protrusively disposed in one of the leftward and rightward directions which is the same as the direction in which the one of the left and right drum turning shafts with the driven gear mounted thereon extends, the shift motor has a motor casing that, together with the shift drum, is positioned within the transverse width of the crankcase, and does not project transversely out of the crankcase and is disposed in a compact layout.

In the above arrangement, the crankcase may be of a vertical split structure including an upper crankcase member and a lower crankcase member; and the extension support wall may be mounted on the lower crankcase member.

With this arrangement, as the extension support wall is mounted on the lower crankcase member of the vertically split crankcase, the shift motor that is mounted on the extension support wall is disposed on a rear portion of the lower crankcase member, allowing the vehicle to have a lower center of gravity.

In the above arrangement, the speed reduction gear train may be arrayed vehicle-longitudinally between the drive gear and the driven gear.

With this arrangement, inasmuch as the speed reduction gear train is arranged in a vehicle-longitudinal array between the driven gear on one of the drum turning shafts of the shift drum and the drive gear of the shift motor disposed on the rear portion of the extension support wall behind the shift drum, the shift motor is disposed in a rear portion of the lower crankcase member out of physical interference with the transmission.

In the above arrangement, the speed reduction gear train may include an idle gear.

With this arrangement, the idle gear is included in the speed reduction gear train that is arranged in a longitudinal array. Therefore, the speed reduction ratios of the speed reduction gear train remain unchanged. The idle gear that is included allows the shift motor to be disposed in the rear portion of the lower crankcase member out of physical interference with the transmission, and does not delay changing gear positions.

In the above arrangement, the speed reduction gear train may be disposed above an oil level line of oil kept in the lower crankcase member.

With this arrangement, because the speed reduction gear train is disposed above the oil level line of oil kept in the lower crankcase member, an adverse effect that friction due to the oil has on the speed reduction gear train is reduced, making it possible to increase the ability of the transmission actuating mechanism to control gear shifting in the transmission.

In the above arrangement, the vehicle power unit may further include an endless chain trained around a drive sprocket fitted over an output shaft of the vehicle power unit and a driven sprocket fitted over a rear axle. The shift motor may be disposed transversely inward of the endless chain in a position superposed on the endless chain as viewed in side elevation.

With this arrangement, since the shift motor is disposed transversely inward of the endless chain in a position superposed on the endless chain as viewed in side elevation, the shift motor is spaced transversely from the endless chain, which tends to oscillate vertically, and is disposed at substantially the same height as the endless chain. Therefore, the vehicle has a lower center of gravity and a sufficient road clearance.

In the above arrangement, the crankcase may be of a vertical split structure including an upper crankcase member and a lower crankcase member; and the extension support wall may be mounted on the upper crankcase member.

With this arrangement, as the extension support wall is mounted on the upper crankcase member of the vertically split crankcase, the shift motor that is mounted on the extension support wall is disposed on a rear portion of the upper crankcase member and hence is protected from pebbles hurtling toward the shift motor.

Effects of the Invention

According to the present invention, in the vehicle power unit in which the transmission apparatus supported together with the internal combustion engine in the crankcase and disposed rearward of the internal combustion engine, the shift motor is a direct current (DC) electric motor that produces a pulsating cogging torque having a maximum value ranging from 0.04 to 0.07 Nm, the maximum value of the cogging torque is 0.04 Nm or larger, and the gear train for transmitting power to the shift drum has multiple speed reduction stages having a speed reduction ratio ranging from 23 to 45. The transmission actuating mechanism is thus able to brake the shift drum effectively with the cogging torque applied from the shift motor through the speed reduction gear train, minimizing an overshoot of the shift drum. The transmission actuating mechanism can stop the shift drum easily in desired angular positions in the absence of an intermittent feed mechanism. Accordingly, the transmission actuating mechanism may be made up of a reduced number of parts and simpler in structure, so that the transmission apparatus is prevented from being enlarged and the vehicle power unit is made small in size and less costly to manufacture.

In addition, as rotation of the shift motor is transmitted to the shift drum to angularly move the shift drum only through the speed reduction gear train, the transmission apparatus is capable of changing gear positions more quickly and smoothly with an electric motor.

The transmission actuating mechanism that is free of an intermittent feed mechanism is free of noise that would otherwise be caused by an intermittent feed mechanism in changing gear positions and hence does not require a soundproof structure.

Providing the speed reduction ratio of the speed reduction gear train is 23 or larger, the transmission actuating mechanism can stop the shift drum easily in desired angular positions in the absence of a stopper mechanism. As no stopper mechanism is included, the transmission apparatus is made smaller in size, making it possible to further reduce the size of the vehicle power unit.

MODES FOR CARRYING OUT THE INVENTION

An embodiment of the present invention will be described below with reference to FIGS. 1 through 8.

Figure 1:
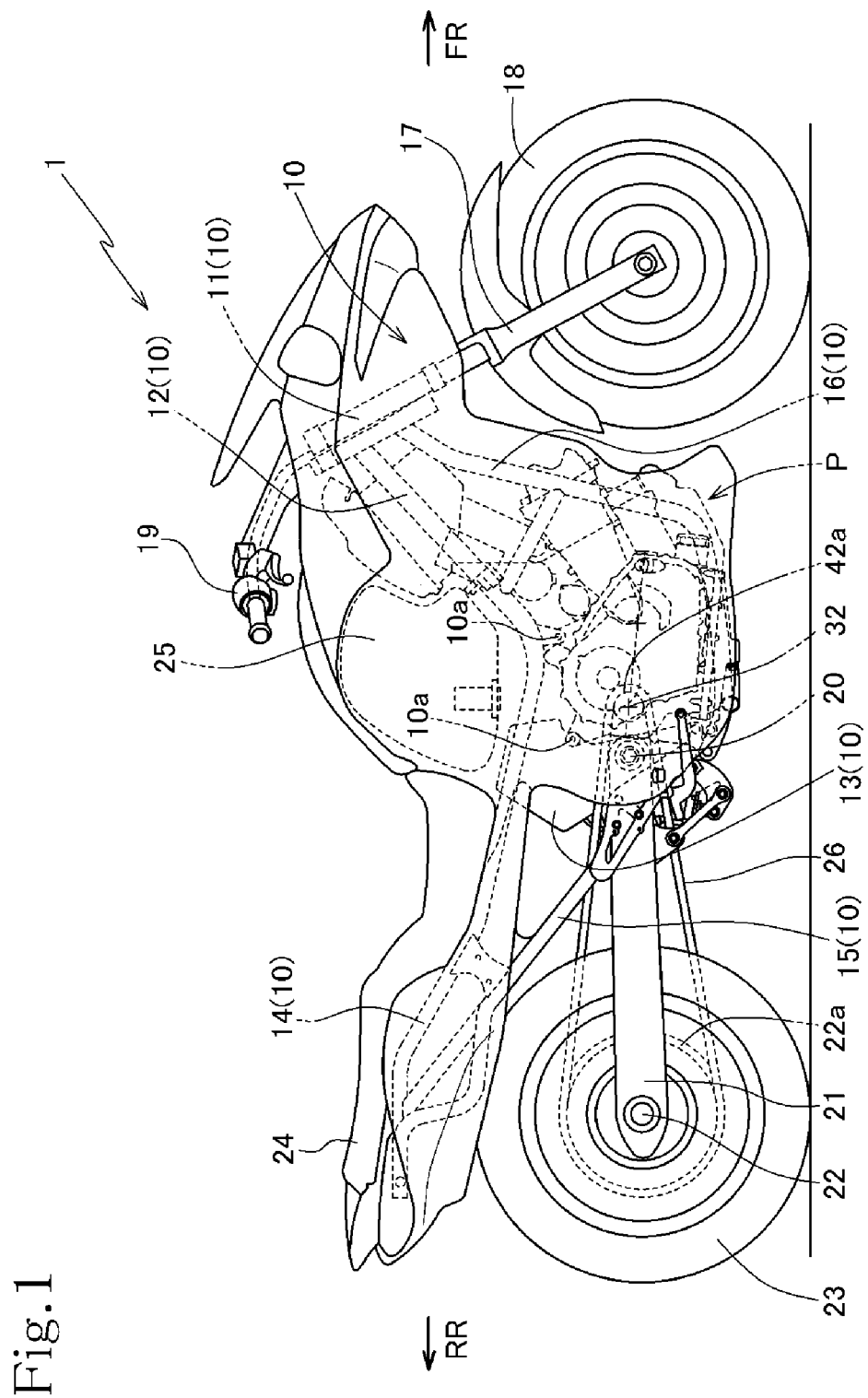
FIG. 1 is a right side elevational view of a motorcycle incorporating a vehicle power unit according to an embodiment of the present invention.

FIG. 1 is a right side elevational view of a motorcycle 1 which is a saddle-type vehicle incorporating a vehicle power unit according to the embodiment of the present invention.

In the description, forward, rearward, leftward, rightward, and similar directional expressions are defined in accordance with the normal orientations of the motorcycle 1 according to the present embodiment that include a forward direction along which the motorcycle 1 moves straight ahead. In the drawings, the reference characters FR represent a forward direction, RR a rearward direction, LH a leftward direction, and RH a rightward direction.

As illustrated in FIG. 1, the motorcycle 1 includes a vehicle body frame 10 having a head pipe 11 disposed in a front portion thereof, a main frame 12 extending obliquely rearward and downward from the head pipe 11 and curved in an intermediate portion and then extending rearward, a central frame 13 extending downward from a rear end of the main frame 12, a seat rail 14 extending rearward from an upper portion of the central frame 13, a middle stay 15 extending between and coupled to a rear portion of the central frame 13 and a rear portion of the seat rail 14, and a down frame 16 extending downward from the head pipe 11.

A front fork 17 with a front wheel 18 rotatably supported on a lower end thereof is dirigibly supported on the head pipe 11.

The front fork 17 has an upper end to which a steering handle 19 is coupled. A swing arm 21 is swingably supported on the central frame 13 by a pivot shaft 20.

The swing arm 21 has a rear end on which a rear wheel 23 is rotatably supported by a rear axle 22.

A rider's seat 24 is mounted on the seat rail 14, and a fuel tank 25 is mounted on the main frame 12 in front of the rider's seat 24.

The motorcycle 1 includes a vehicle power unit P for driving the rear wheel 23. The vehicle power unit P is supported on a plurality of mounting brackets 10a on the vehicle body frame 10. The vehicle power unit P is oriented laterally such that it has a crankshaft 32 whose axis of rotation is oriented in leftward and rightward directions transversely across the vehicle body frame 10.

The vehicle power unit P has an output shaft, i.e., a countershaft 42 (see FIG. 3), having an end fitted in a drive sprocket 42a. An endless chain 26 is trained around the drive sprocket 42a and a driven sprocket 22a fitted over an end of the rear axle 22.

Figure 2:
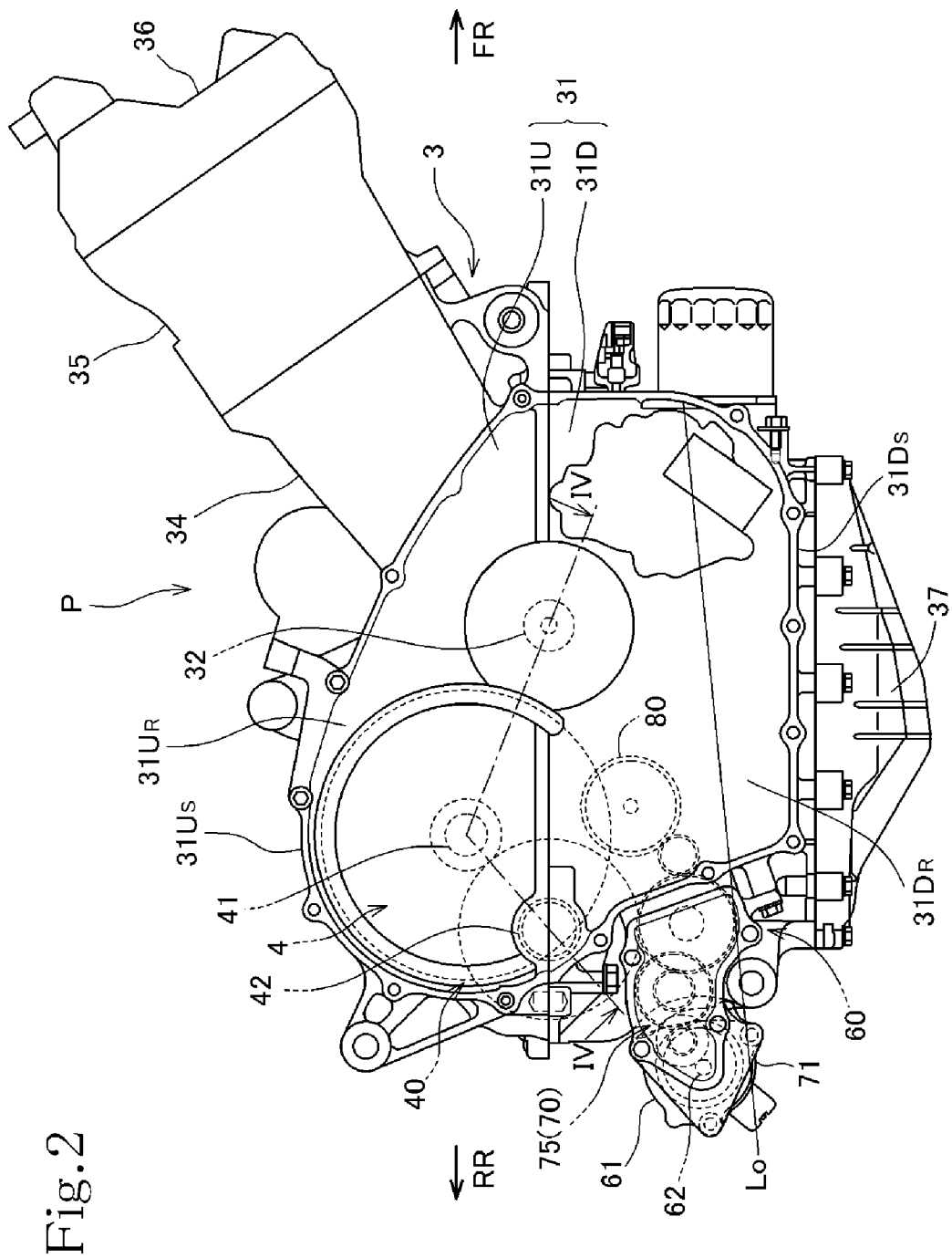
FIG. 2 is an enlarged right side elevational view of the vehicle power unit.

As illustrated in FIG. 2, the vehicle power unit P includes, in integral combination, a water-cooled, two-cylinder, four-stroke cycle internal combustion engine 3 and a transmission apparatus 4 coupled to a rear portion of the internal combustion engine 3.

The vehicle power unit P includes a crankcase 31 on which the crankshaft 32 is rotatably supported. The crankcase 31 extends rearward and houses the transmission apparatus 4 therein.

The crankcase 31 is of a vertically split structure including an upper crankcase member 31U and a lower crankcase member 31D.

The upper crankcase member 31U is made up of a left side wall $31U_L$ and a right side wall $31U_R$ that face each other in spaced-apart relation, and an upper peripheral wall $31U_S$ extending rightward and leftward integrally from peripheral edges of the left and right side walls $31U_L$ and $31U_R$, except their mating surfaces. The lower crankcase member 31D is made up of a left side wall $31D_L$ and a right side wall $31D_R$ that face each other in spaced-apart relation and a lower peripheral wall $31D_S$ extending rightward and leftward integrally from peripheral edges of the left and right side walls $31D_L$ and $31D_R$, except their mating surfaces.

The upper peripheral wall $31U_S$ of the upper crankcase member 31U has a front portion on which a cylinder block 34, a cylinder head 35, and a cylinder head cover 36 are successively stacked obliquely forward and upward. The cylinder block 34, the cylinder head 35, and the cylinder head cover 36 project obliquely forward and upward from the front portion of the upper peripheral wall $31U_S$.

The lower peripheral wall $31D_S$ of the lower crankcase member 31D has an open bottom to which a downwardly protruding oil pan 37 is fastened.

The upper peripheral wall $31U_S$ and the lower peripheral wall $31D_S$ of the crankcase 31 are joined into a tubular wall whose right opening is covered with a right crankcase cover 38R (see FIG. 4) and whose left opening is covered with a left crankcase cover 38L.

The crankshaft 32 that extends in the leftward and rightward directions transversely across the vehicle body is rotatably supported on the mating surfaces of the upper crankcase member 31U and the lower crankcase member 31D.

Specifically, the mating surfaces of the left side wall $31U_L$ and the right side wall $31U_R$ of the upper crankcase member 31U and the mating surfaces of the left side wall $31D_L$ and the right side wall $31D_R$ of the lower crankcase member 31D are mated to each other, sandwiching the crankshaft 32 rotatably supported thereon.

Figure 4:
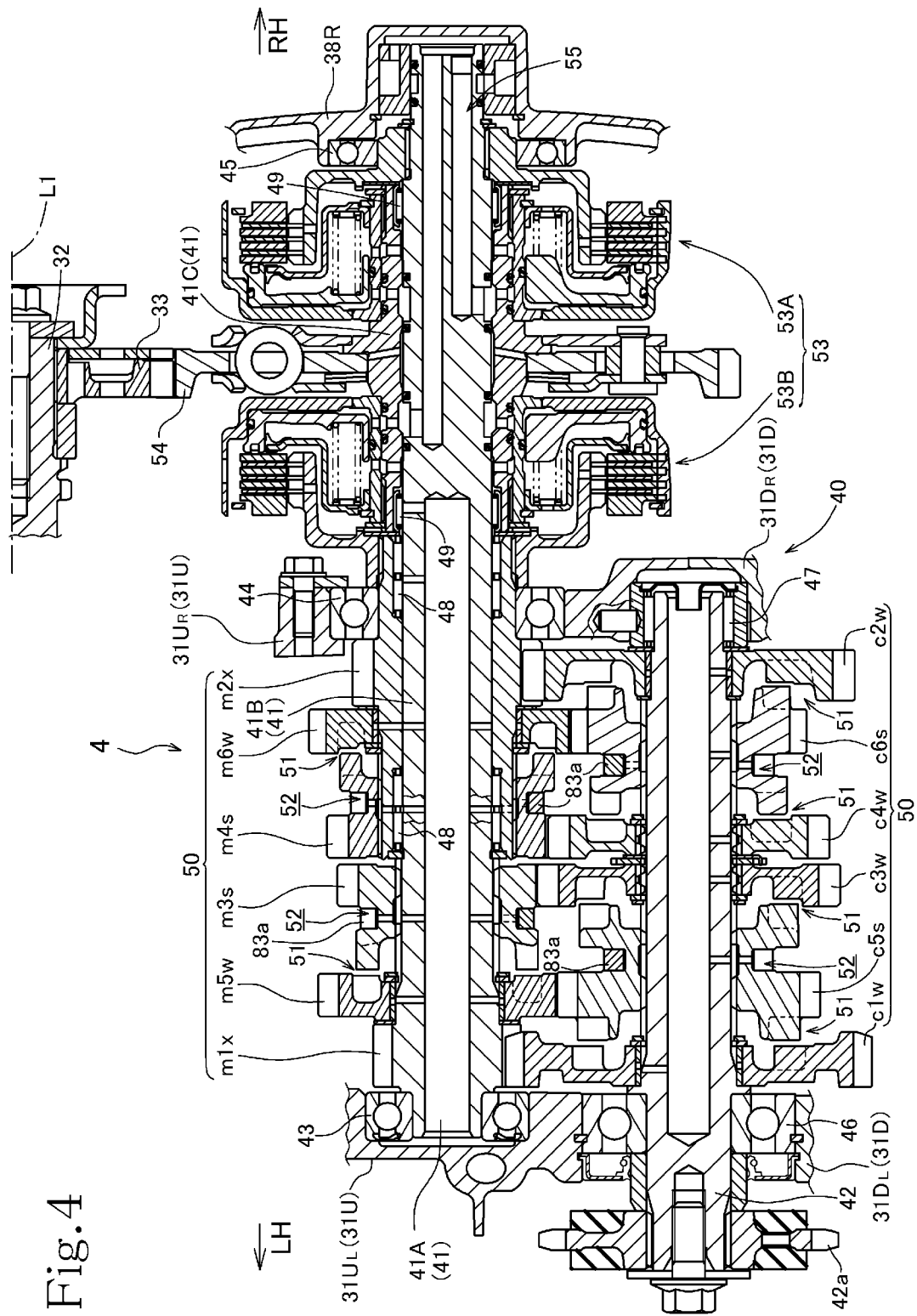
FIG. 4 is a sectional development view of a portion of the vehicle power unit, taken alone line IV-IV of FIG. 2.

As illustrated in FIG. 4, the transmission apparatus 4 that transmits the drive power from the internal combustion engine 3 at a desired one of gear positions includes a normally meshing transmission 40, a transmission actuating mechanism 60 for selecting a gear position in the transmission 40, and a clutch mechanism 53.

The transmission 40 has a main shaft 41, a countershaft 42, and a normally meshing gear group 50 mounted on the main shaft 41 and the countershaft 42.

As illustrated in FIGS. 2 and 4, the main shaft 41 is extends in the upper crankcase member 31U obliquely rearward and upward of and parallel to the axis of rotation of the crankshaft 32.

Figure 3:
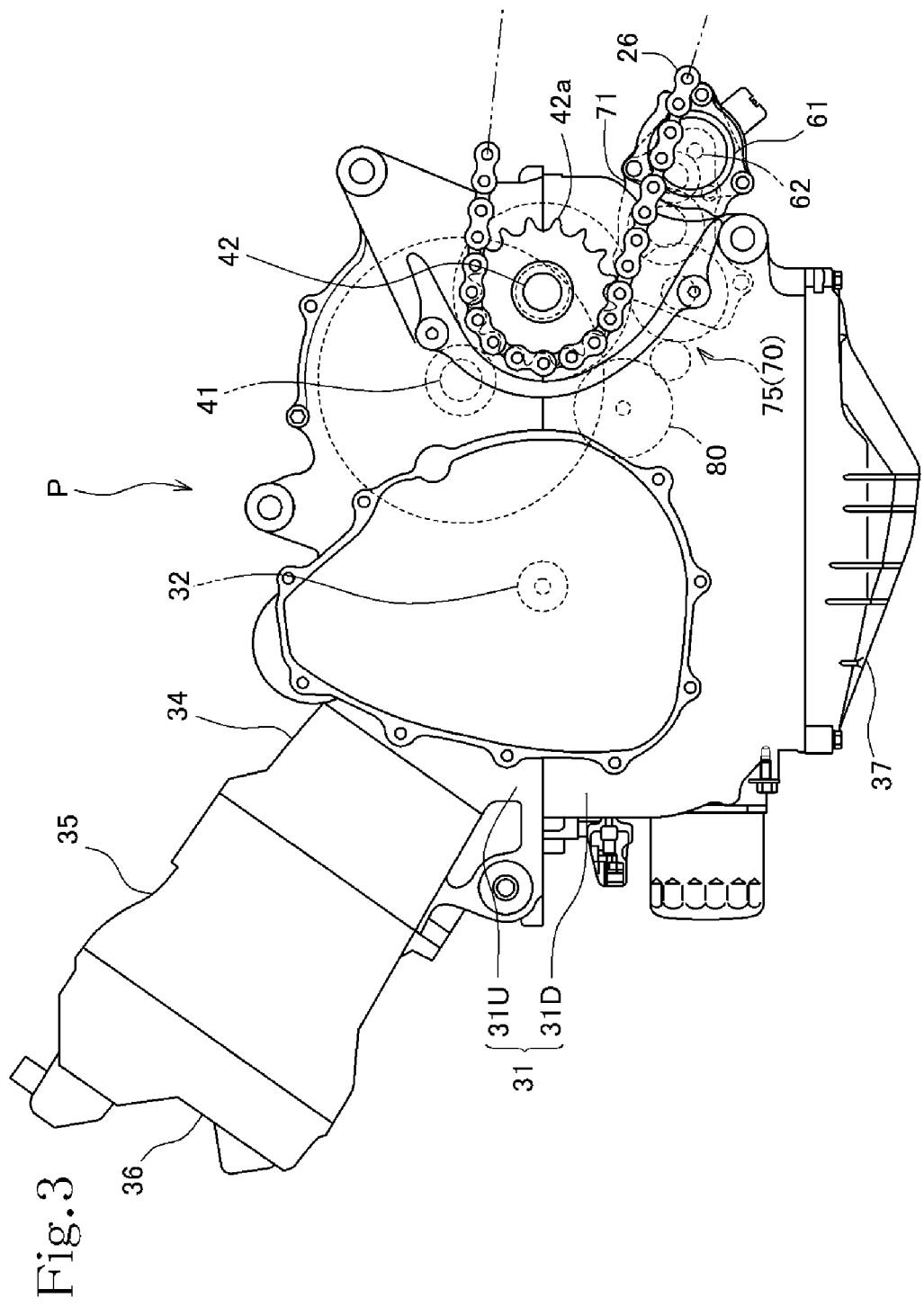
FIG. 3 is an enlarged left side elevational view of the vehicle power unit.

As illustrated in FIG. 3, the main shaft 41 has a left end rotatably supported on the left side wall $31U_L$ of the upper crankcase member 31U by a ball bearing 43 (see FIG. 4), a central portion rotatably supported on the right side wall $31U_R$ of the upper crankcase member 31U by a ball bearing 44, and a right end rotatably supported on the right crankcase cover 38R by a ball bearing 45.

The countershaft 42 is located between the upper and lower crankcase members 31U and 31D and obliquely rearward and downward of and parallel to the main shaft 41.

The countershaft 42 has a left end extending through a ball bearing 46 in the left side wall $31U_L$. The countershaft 42 has a left end portion rotatably supported by the ball bearing 46, and a right end sandwiched between the upper and lower crankcase members 31U and 31D and rotatably supported by a needle bearing 47 in the right side wall $31U_R$.

The drive sprocket 42a is fitted over the left end of the countershaft 42.

As illustrated in FIG. 4, the main shaft 41 includes an elongate main-shaft inner shaft 41A, a main-shaft outer shaft 41B, and a clutch outer shaft 41C.

The main-shaft outer shaft 41B covers a portion of the main-shaft inner shaft 41A that extends from the center thereof to the center of a left half portion thereof, and is relatively rotatably mounted on the main-shaft inner shaft 41A by needle bearings 48.

The clutch outer shaft 41c covers a portion of the main-shaft inner shaft 41A that extends from the center thereof to a right end portion thereof, and is relatively rotatably mounted on the main-shaft inner shaft 41A by needle bearings 49.

Six drive gears m1 through m6, ranging from first to sixth gear positions, are mounted on the main shaft 41 and six driven gears c1 through c6, ranging from first through sixth gear positions, are mounted on the countershaft 42.

The drive gears m1 through m6 and the driven gears c1 through c6 are arranged in gear pairs corresponding to second, sixth, fourth, third, fifth, and first gear positions successively from the right. The drive gears m1 through m6 and the driven gears c1 through c6 thus held as meshing gear pairs jointly make up the normally meshing gear group 50.

The drive gears m2, m4, and m6 in the even-numbered gear positions are mounted on the main-shaft outer shaft 41B, whereas the drive gears m1, m3, and m5 in the odd-numbered gear positions are mounted on the main-shaft inner shaft 41A.

As illustrated in FIG. 4, a suffix "x" added to the reference characters of some of the drive gears m1 through m6 and the driven gears c1 through c6 indicates that the corresponding gears are fixed gears integrally formed with the shaft 41, a suffix "w" indicates that the corresponding gears are free gears relatively rotatably supported on the shafts 41 and 42, and a suffix "s" indicates that the corresponding gears are shifter gears axially movable on the shafts 41 and 42.

Specifically, the first-gear-position drive gear m1 and the second-gear-position drive gear m2 are fixed gears, the fifth-gear-position drive gear m5, the six-gear-position drive gear m6, the first-gear-position driven gear c1, the second-gear-position driven gear c2, the third-gear-position driven gear c3, and the fourth-gear-position driven gear c4 are free gears, and the third-gear-position drive gear m3, the fourth-gear-position drive gear m4, the fifth-gear-position drive gear m5, and the sixth-gear-position driven gear c6 are shifter gears.

Dog clutches 51 are disposed between the shifter gears m3, m4, c5, and c6 and the free gears m5, m6, c1, c2, c3, and c4 adjacent to the shifter gears m3, m4, c5, and c6. When the shifter gears m3, m4, c5, and c6 are moved closely to the free gears m5, m6, c1, c2, c3, and c4 adjacent thereto, the dog clutches 51 engage, connecting those gears against relative rotation.

The shifter gears m3, m4, c5, and c6 have respective fork grooves 52 defined circumferentially in outer circumferential surfaces thereof for receiving therein forked portions of shift forks 87 (see FIG. 6) 3 to be described later.

The clutch mechanism 53 is disposed on a right half portion of the main shaft 41. As will be noted from FIG. 4, the clutch mechanism 53 includes a first hydraulic clutch 53A and a second hydraulic clutch 53B that are mounted on the clutch outer shaft 41C respectively on both axial sides of a primary driven gear 54 that is relatively non-rotatably fitted over the center of the clutch outer shaft 41C.

Power from the crankshaft 32 is transmitted through a primary drive gear 33 fitted over the crankshaft 32 and the primary driven gear 54 to the clutch mechanism 53. When the first hydraulic clutch 53A and the second hydraulic clutch 53B are selectively engaged by a hydraulic circuit 55, the power from the crankshaft 32 is transmitted through the first hydraulic clutch 53A or the second hydraulic clutch 53B to the main-shaft inner shaft 41A or to the main-shaft outer shaft 41B.

Figure 6:
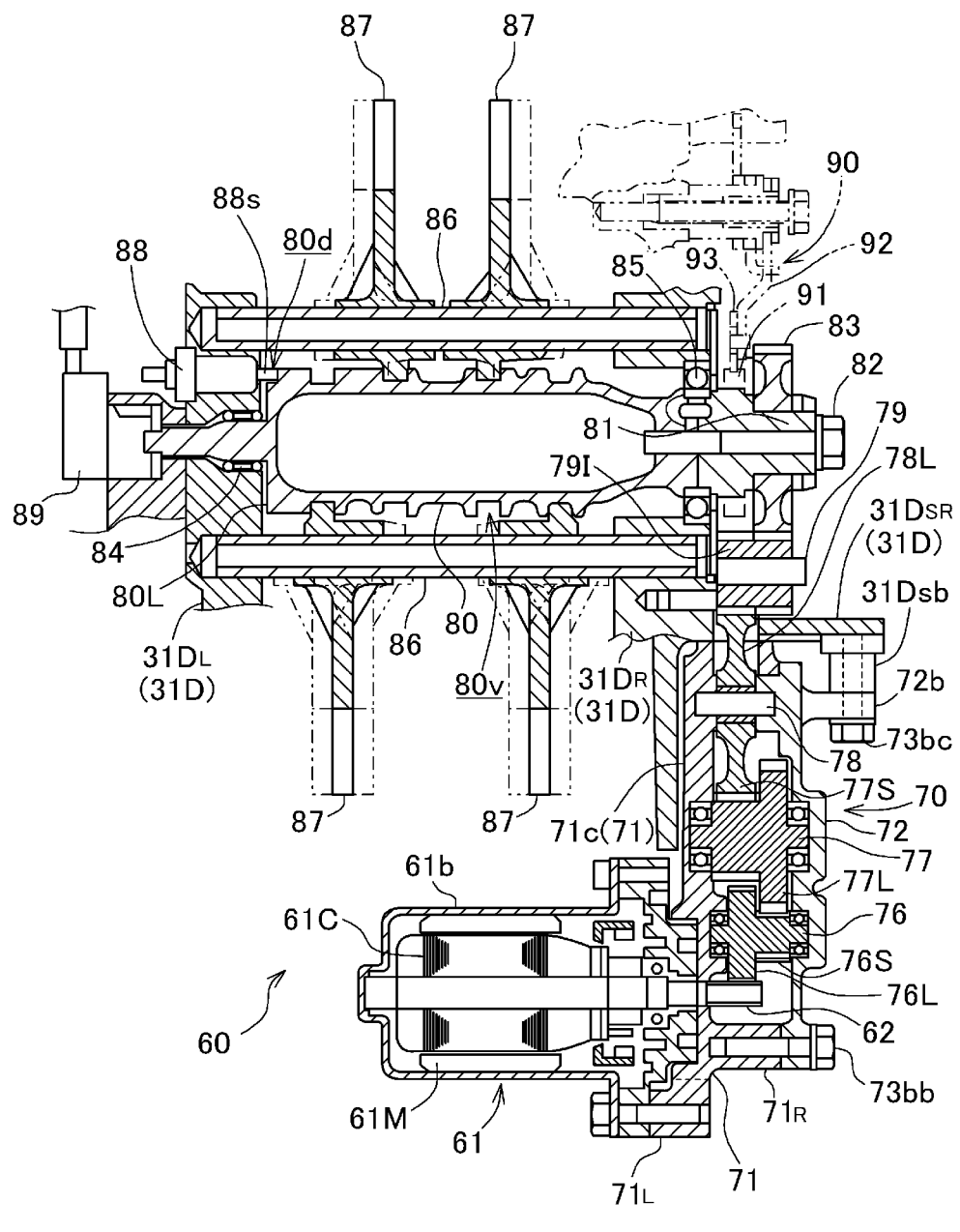
FIG. 6 is a sectional development view of a portion of the vehicle power unit, taken alone line VI-VI of FIG. 5.

As illustrated in FIG. 6, the transmission actuating mechanism 60 that moves the shifter gears m3, m4, c5, and c6 of the transmission 40 to change gear positions includes a shift motor 61, a speed reduction gear mechanism 70, a shift drum 80, a shift fork shaft 86, and a plurality of shift forks 87.

The shift drum 80 is disposed downward of the main shaft 41 and extends parallel to the main shaft 41. The shift drum 80 has a left end rotatably supported on the left side wall $31D_L$ of the lower crankcase member 31D by a needle bearing 84 and a right end rotatably supported on the right side wall $31D_R$ of the lower crankcase member 31D by a ball bearing 85.

A neutral switch 88 is inserted to the right into the left side wall $31D_L$ near the needle bearing 84 disposed therein. The neutral switch 88 has a detection rod 88s that is spring-loaded to project to the right and slidably pressed against a left side face 80L of a tubular member of the shift drum 80 with lead grooves 80v defined in an outer circumferential surface thereof.

The detection rod 88s of the neutral switch 88 is held in sliding contact with an annular portion of the left side face 80L of the shift drum 80. The annular portion includes a recess 80d defined therein that receives the distal end of the detection rod 88s when the shift drum 80 is in a neutral angular position.

Therefore, when the shift drum 80 is in the neutral angular position, the spring-loaded detection rod 88s of the neutral switch 88 has its distal end projecting in the recess 80d in the annular portion of the left side face 80L, so that the neutral switch 88 can detect the neutral angular position, i.e., a neutral gear state, of the shift drum 80.

Since the spring-loaded detection rod 88s of the neutral switch 88 has its distal end projecting in the recess 80d in the annular portion of the left side face 80L of the shift drum 80, the neutral switch 88 has a detent function, positioning the shift drum 80 in the neutral angular position.

A drum angular displacement sensor 89 for detecting the angular displacement of the shift drum 80 is disposed at a left shaft portion of the shift drum 80 that extends through the needle bearing 84.

Figure 7:
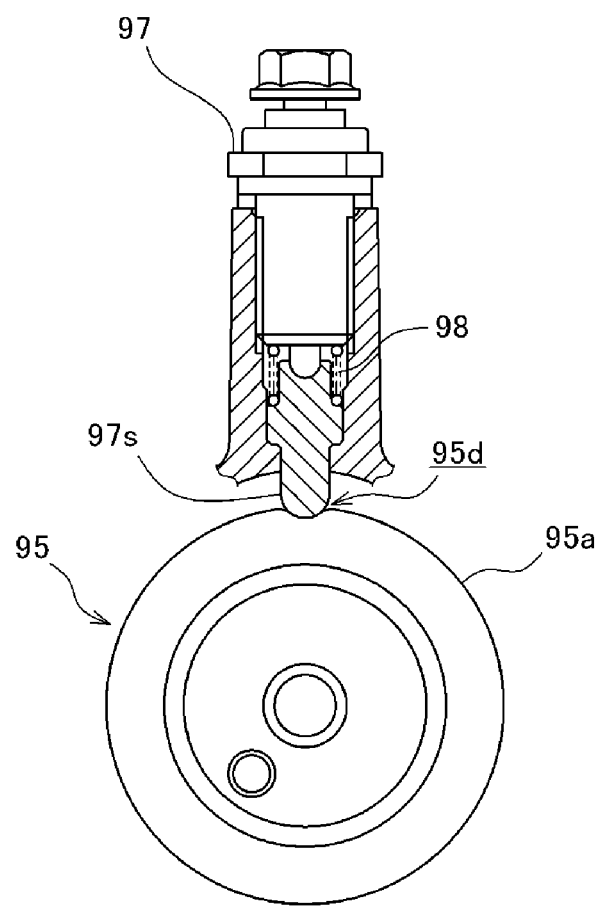
FIG. 7 is a sectional view of a neutral switch according to a modification.

According to a modification illustrated in FIG. 7, a neutral switch 97 may have a detection rod 97s normally biased by a spring 98 to have a distal end thereof projecting toward an outer circumferential surface 95a of an end portion of a tubular member of a shift drum 95 with lead grooves defined in an outer circumferential surface thereof.

The outer circumferential surface 95a of the shift drum 95 has a recess 95d defined therein for receiving therein the distal end of the detection rod 97s when the shift drum 95 is in a neutral angular position.

Consequently, when the shift drum 95 is in the neutral angular position, the spring-loaded detection rod 97s of the neutral switch 97 has its distal end projecting in the recess 95d in the shift drum 95, so that the neutral switch 97 can detect the neutral angular position, i.e., a neutral gear state, of the shift drum 95 and position the shift drum 95 in the neutral angular position due to its detent function.

As illustrated in FIG. 6, a drum turning shaft 81 is fastened coaxially to the right end of the shift drum 80 by a bolt 82. The junction portion between the drum turning shaft 81 and the shift drum 80 is rotatably supported on the right side wall $31D_R$ by the ball bearing 85.

A driven gear 83 is fitted over the drum turning shaft 81 that extends rightward through the right side wall $31D_R$ around the right end of the shift drum 80.

The speed reduction gear mechanism 70 is mounted on a rear surface of a right rear peripheral wall $31D_{SR}$, behind the right side wall $31D_R$, of the lower peripheral wall $31D_S$ of the lower crankcase member 31D.

Figure 5:
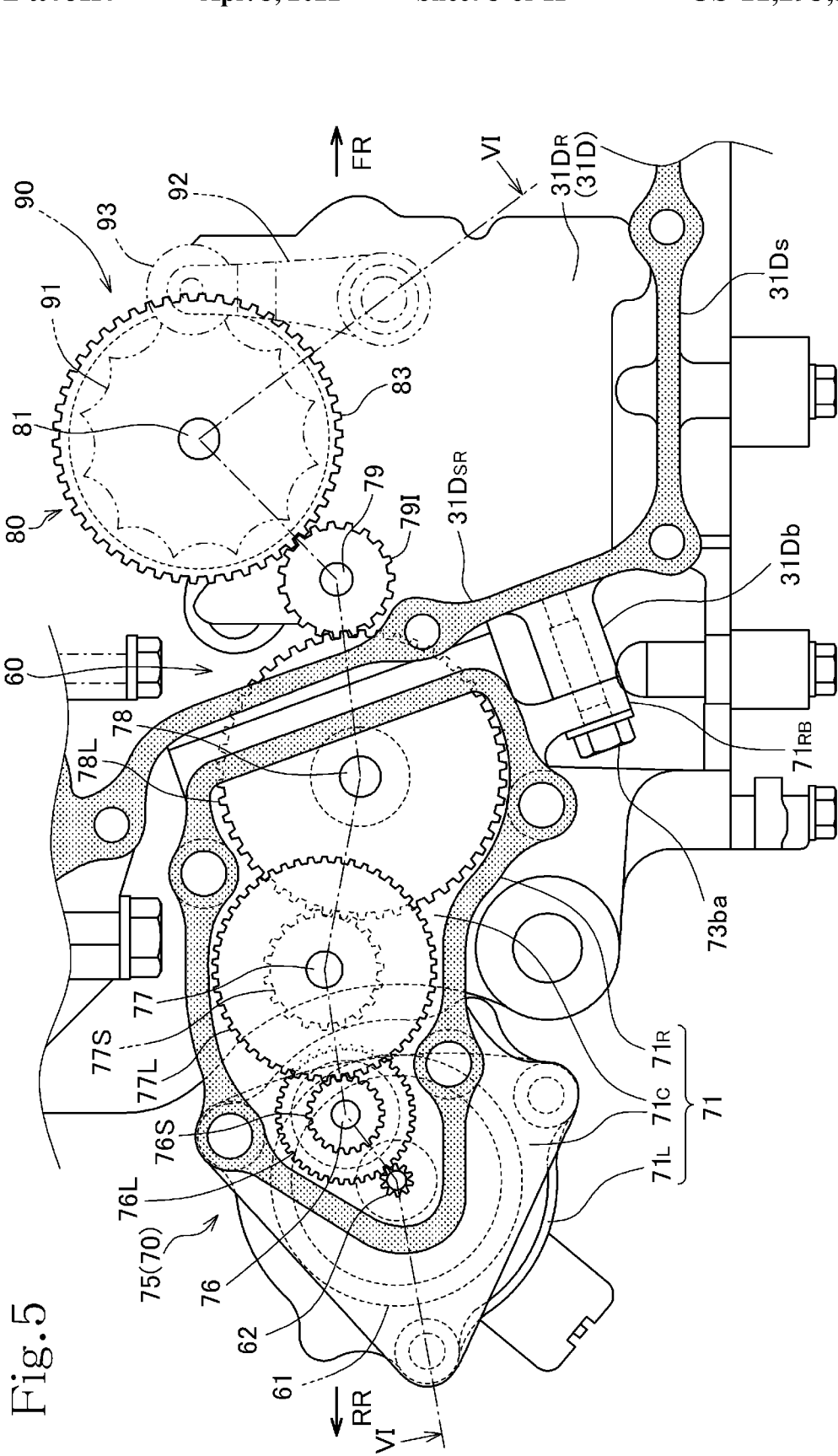
FIG. 5 is a fragmentary right side elevational view, partly omitted from illustration, of the vehicle power unit.

As illustrated in FIGS. 5 and 6, the speed reduction gear mechanism 70 has an extension support wall 71 mounted on the right rear peripheral wall $31D_{SR}$. The extension support wall 71 is disposed behind the right side wall $31D_R$ of the lower crankcase member 31D and extends such that a front portion thereof is superposed on the right side wall $31D_R$.

The extension support wall 71 includes a longitudinally elongate vertical wall $71_C$ extending rearward from the right side wall $31D_R$, a longitudinally elongate annular frame wall $71_R$ extending rightward from the vertical wall $71_C$, and an annular frame wall $71_L$ extending leftward from a rear portion of the vertical wall $71_C$ that projects rearward from the annular frame wall $71_R$.

As illustrated in FIG. 5, the extension support wall 71 has a front end portion held in abutment against the rear surface of the right rear peripheral wall $31D_{SR}$ of the lower peripheral wall $31D_S$ of the lower crankcase member 31D. A bracket $71_{RB}$ on a front portion of the annular frame wall $71_R$ of the extension support wall 71 is fastened to a mount boss 31Db on the right rear peripheral wall $31D_{SR}$ by a bolt 73ba.

With the extension support wall 71 being mounted on the right rear peripheral wall $31D_{SR}$ of the lower crankcase member 31D, as illustrated in FIG. 6, a right side surface of the right side wall $31D_R$ of the lower crankcase member 31D and a right side surface of the vertical wall $71_C$ lie substantially flush with each other.

The shift motor 61 is mounted on the annular frame wall $71_L$ that is disposed on the left side of the rear portion of the extension support wall 71. The shift motor 61 has a small-diameter drive gear 62 on its output shaft that projects to the right from the right side surface of the vertical wall $71_C$.

The small-diameter drive gear 62 extends rightward through the vertical wall $71_C$ into a space defined by the annular frame wall $71_R$.

As illustrated in FIG. 6, the shift motor 61 includes a motor casing 61b disposed on the left side of the vertical wall $71_C$ and the right side wall $31D_R$ and on the right side of the left side wall $31D_L$.

Specifically, the motor casing 61b of the shift motor 61 is disposed between the left side wall $31D_L$ and the right side wall $31D_R$ of the lower crankcase member 31D, i.e., is positioned within the transverse width of the crankcase 31 without projecting transversely out of the crankcase 31. The shift motor 61 is thus disposed in a compact layout.

As the extension support wall 71 is mounted on the lower crankcase member 31D of the vertically split crankcase 31, the shift motor 61 that is mounted on the extension support wall 71 is disposed on a rear portion of the lower crankcase member 31D, allowing the vehicle to have a lower center of gravity.

As shown in FIG. 1, the endless chain 26 is trained around the drive sprocket 42a that is fitted over the end of the output shaft of the vehicle power unit P, i.e., the countershaft 42 (see FIG. 4) extending to the left from the left side wall $31D_L$, and around the driven sprocket 22a that is fitted over the end of the rear axle 22. As will be noted from FIG. 4, the endless chain 26 that is trained around the drive sprocket 42a is disposed on the left side of the left side wall $31D_L$.

Therefore, the shift motor 61 on the right side of the left side wall $31D_L$ of the lower crankcase member 31D is disposed transversely inward or rightward of the endless chain 26. As viewed in side elevation illustrated in FIG. 3, the shift motor 61 is disposed at a position superposed on the endless chain 26.

Specifically, as illustrated in FIG. 3, the speed reduction gear mechanism 70 has a speed reduction gear train 75 arranged in a longitudinal array and supported on the extension support wall 71, and the shift motor 61 is mounted on the rear portion of the extension support wall 71. Since the shift motor 61 is spaced apart transversely from the endless chain 26, which tends to oscillate vertically, and is disposed at substantially the same height as the endless chain 26, the vehicle has a lower center of gravity and a sufficient road clearance.

The driven gear 83 is fitted over the drum turning shaft 81 that is joined to the right end of the shift drum 80 and extends rightward through the right side wall $31D_R$ of the lower crankcase member 31D. The drive gear 62 of the shift motor 61 mounted on the vertical wall $71_C$ of the extension support wall 71 is positioned on the right side of the vertical wall $71_C$ whose right side surface lies flush with the right side surface of the right side wall $31D_R$. The driven gear 83 and the drive gear 62 are thus arranged along the right side surfaces, which lie flush with each other, of the right side wall $31D_R$ and the vertical wall $71_C$.

The speed reduction gear train 75 that transmits power from the drive gear 62 to the driven gear 83 is supported on the extension support wall 71 and on the right side wall $31D_R$ and is arranged in a longitudinal array.

Specifically, the speed reduction gear train 75 is disposed in the annular frame wall $71_R$ that extends to the right from the vertical wall $71_C$ of the extension support wall 71. The annular frame wall $71_R$ has a right opening covered with a cover 72.

The cover 72 has a peripheral mating surface held against an open end face of the annular frame wall $71_R$ and is fastened to the annular frame wall $71_R$ by a plurality of bolts 73bb spaced apart from each other along the peripheral mating surface of the cover 72. The annular frame wall $71_R$ and the cover 72 jointly define a gear chamber that houses the speed reduction gear train 75 therein.

As illustrated in FIG. 6, a bracket 72b that projects rightward from a front portion of the cover 72 is placed on the mount boss 31Db on the right rear peripheral wall $31D_{SR}$ and fastened thereto by a bolt 73bc.

As illustrated in FIGS. 5 and 6, the speed reduction gear train 75, which has three speed reduction stages, includes three gear shafts 76, 77, and 78 oriented transversely in leftward and rightward directions and have both ends rotatably supported on the vertical wall $71_C$ of the extension support wall 71 and the cover 72.

The three gear shafts 76, 77, and 78 will be referred to as first, second, and third gear shafts 76, 77, and 78. A large-diameter gear 76L and a small-diameter gear 76S are integral with the first gear shaft 76 that is positioned in a rear position. A large-diameter gear 77L and a small-diameter gear 77S are integral with the second gear shaft 77 that is positioned forward of the first gear shaft 76. A large-diameter gear 78L is rotatably supported on the third gear shaft 78 that is positioned forward of the second gear shaft 77.

The small-diameter drive gear 62 of the shift motor 61 that projects to the right from the right side surface of the vertical wall $71_C$ is held in mesh with the large-diameter gear 76L of the first gear shaft 76, providing a first speed reduction stage R1. The small-diameter gear 76S of the first gear shaft 76 is held in mesh with the large-diameter gear 77L of the second gear shaft 77, providing a second speed reduction stage R2. The small-diameter gear 77S of the second gear shaft 77 is held in mesh with the large-diameter gear 78L of the third gear shaft 78, providing a third speed reduction stage R3.

The speed reduction gear train 75 thus has three speed reduction stages including the first, second, and third speed reduction stages R1, R2, and R3.

The large-diameter gear 78L of the third gear shaft 78 extends into a space inside of the lower peripheral wall $31D_S$ through an opening defined in a front wall portion of the annular frame wall $71_R$ of the extension support wall 71 and through an opening defined in the right rear peripheral wall $31D_{SR}$ of the lower peripheral wall $31D_S$ of the lower crankcase member 31D, as will be noted from FIG. 5.

An idle gear 79I is rotatably supported on an idle gear shaft 79 that is supported on the right side wall $31D_R$ obliquely downward and rearward of the drum turning shaft 81 joined to the right end of the shift drum 80 and forward of the third gear shaft 78. The idle gear 79I is held in mesh with the large-diameter gear 78L of the third gear shaft 78 that extends into the space inside of the lower peripheral wall $31D_S$ and also with the driven gear 83 fitted over the drum turning shaft 81.

In other words, the speed reduction gear train 75 that transmits power from the drive gear 62 to the driven gear 83 includes the idle gear 79I.

Therefore, rotation of the drive gear 62 of the shift motor 61 is reduced in speed by the three speed reduction stages, i.e., the first, second, and third speed reduction stages R1, R2, and R3, of the speed reduction gear train 75, and transmitted through the idle gear 79I to the driven gear 83, from which the rotation is transmitted to the shift drum 80 coupled to the driven gear 83, thereby angularly moving the shift drum 80.

When the shift drum 80 is angularly moved, the shift forks 87 are guided by the lead grooves 80v defined in the outer circumferential surface of the shift drum 80 to move axially, axially moving the shifter gears m3, m4, c5, and c6 of the transmission 40 to change gear positions of the transmission 40.

The numbers of the gear teeth of the drive gear 62, the large-diameter gear 76L, the small-diameter gear 76S, the large-diameter gear 77L, the small-diameter gear 77S, the large-diameter gear 78L, the idle gear 79I, and the driven gear 83 of the speed reduction gear train 75 are 11, 45, 10, 33, 17, 42, 17, and 42, respectively.

The first speed reduction stage R1 has a speed reduction ratio of approximately 4.1 (=45/11), the second speed reduction stage R2 has a speed reduction ratio of approximately 3.3 (=33/10), and third speed reduction stage R3 has a speed reduction ratio of approximately 2.5 (=42/17). The speed reduction gear train 75 has an overall speed reduction ratio of approximately 33.4.

The shift motor 61 is a DC commutator motor with a permanent-magnet field. The shift motor 61 includes ten coils 61C arrayed circumferentially on a rotor thereof and ten permanent magnets 61M arrayed circumferentially on a stator thereof that is disposed around the rotor.

A cogging torque produced by the shift motor 61 when magnetic forces from the permanent magnets 61M act on the cores of the coils 61C with no electric current flowing through the coils 61C has a maximum value of approximately 0.052 Nm.

Figure 8:
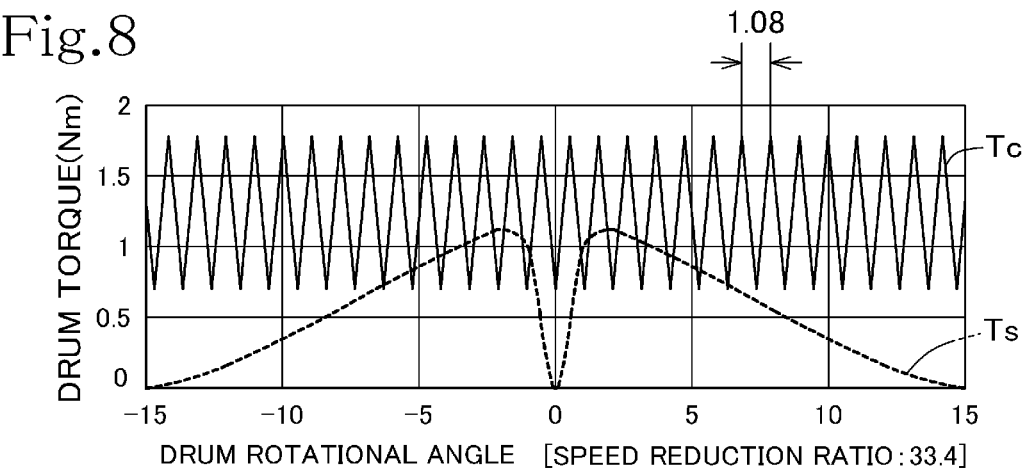
FIG. 8 is a graph illustrating cogging torque changes acting on a shift drum in case the speed reduction ratio of a speed reduction gear train is 33.4.

FIG. 8 relates to the transmission actuating mechanism 60 described above, and is a graph illustrating changes in cogging torque acting on the shift drum 80 with respect to the angular displacement of the shift drum 80 at the time the shift drum 80 is angularly moved by the shift motor 61 through the speed reduction gear train 75 whose speed reduction ratio is approximately 33.4.

The graph of FIG. 8 has a horizontal axis representing the angular displacement of the shift drum 80 or angles (degrees) through which the shift drum 80 is angularly moved. It is assumed that the angular displacement of the shift drum 80 positioned in a certain gear position is 0 degree, and the shift drum 80 is angularly moved through positive angles for shifting up gear positions and through negative angles for shifting down gear positions.

The graph of FIG. 8 has a vertical axis representing the torque (Nm) applied to the shift drum 80, i.e., drum torque.

The cogging torque acting on the drive gear 62 from the shift motor 61 pulsates as the shift motor 61 rotates, and has a maximum value of approximately 0.052 Nm.

The cogging torque acting on the drive gear 62 is transmitted through the speed reduction gear train 75 whose speed reduction ratio is approximately 33.4, and acts on the shift drum 80 as a pulsating drum torque $T_C$ having a maximum value of 1.74 (=0.052×33.4) Nm, as depicted in FIG. 8.

The shift motor 61 that has the ten coils 61C and the ten permanent magnets 61M produces a cogging torque with ten pulsations per rotation of the drive gear 62. In other words, the cogging torque pulsates each time the drive gear 62 rotates through an angle of 36 degrees. The cogging torque, denoted by Tc in FIG. 8, that is transmitted through the speed reduction gear train 75, whose speed reduction ratio is approximately 33.4, to act on the shift drum 80 pulsates each time the shift drum 80 is angularly moved through an angle of 1.08 (=36/33.4) degrees.

In FIG. 8, a broken-line curve represents a stopper torque Ts that is applied to the shift drum 80 by a stopper mechanism 90 (see FIGS. 5 and 6) for stopping the shift drum 80 in angular positions.

As indicated by the broken lines in FIGS. 5 and 6, the stopper mechanism 90 includes a star-shaped cam 91 mounted on the drum turning shaft 81 of the shift drum 80 and a stopper roller 93 rotatably supported on the distal end of a stopper arm 92 normally biased to swing toward the star-shaped cam 91 and pressed against the uneven cam surface of the star-shaped cam 91. When the stopper roller 93 is fitted in one of the recesses in the uneven cam surface of the star-shaped cam 91, the stopper mechanism 90 stops the shift drum 80 in an angular position corresponding to one of the gear positions.

As illustrated in FIG. 8, a torque applied by the stopper mechanism 90 to the shift drum 80 is 0 at the 0-degree angular displacement of the shift drum 80 in a certain gear position, and sharply rises on both sides of the 0 torque.

When the angular displacement of the shift drum 80 is 0 degree, the stopper roller 93 is fitted in one of the recesses in the uneven cam surface of the star-shaped cam 91. For angularly moving the shift drum 80 from the 0-degree angular displacement to change gear positions, it is necessary to apply a torque of approximately 1.15 Nm or larger beyond the peak torque applied by the stopper mechanism 90, on both sides of the 0-degree angular displacement of the shift drum 80. If the applied torque is smaller than approximately 1.15 Nm, it fails to turn the shift drum 80.

A comparison between the stopper torque Ts applied to the shift drum 80 by the stopper mechanism 90 and the cogging torque Tc acting on the shift drum 80 indicates that the cogging torque Tc has the maximum value of approximately 1.74 Nm, as depicted in FIG. 8, which is higher than the maximum value of approximately 1.15 Nm of the stopper torque Ts.

Therefore, the transmission actuating mechanism 60 that includes the shift motor 61 and the speed reduction gear train 75 has the same positioning function as the stopper mechanism 90 on account of the cogging torque Tc acting on the shift drum 80. The transmission actuating mechanism 60 therefore produces a shift drum adjustment torque in an appropriate range. This means that the stopper mechanism 90 can be dispensed with.

The transmission actuating mechanism 60 also lacks an intermittent feed mechanism that has heretofore been required. Without the intermittent feed mechanism, the transmission actuating mechanism 60 is able to effectively suppress an overshooting angular displacement of the shift drum 80 with the cogging torque of the shift motor 61 applied from the shift drum 80 through the speed reduction gear train 75, thus minimizing an overshoot of the shift drum 80 to stop the shift drum 80 accurately at a target angle.

The transmission actuating mechanism 60 that is free of an intermittent feed mechanism is free of noise that would otherwise be caused by an intermittent feed mechanism in changing gear positions and hence does not require a soundproof structure.

As described above, the transmission actuating mechanism 60 can stop the shift drum 80 easily at desired angular positions in the absence of the intermittent feed mechanism and a stopper mechanism. Accordingly, the transmission actuating mechanism 60 may be made up of a reduced number of parts, is simpler in structure, and less costly to manufacture.

In addition, as rotation of the shift motor 61 is transmitted to the shift drum 80 to angularly move the shift drum 80 only through the speed reduction gear train 75, the transmission 40 is capable of changing gear positions more quickly and smoothly with an electric motor.

Inasmuch as the speed reduction gear train 75 has the three speed reduction stages R1, R2, and R3, the speed reduction stages R1, R2, and R3 may have small speed reduction ratios, i.e., approximately 4.1, approximately 3.3, and approximately 2.5, respectively. As a result, the large-diameter gears 76L, 77L, and 78L of the respective speed reduction stages R1, R2, and R3 may have small diameters, making the speed reduction gear train 75 compact.

The compact speed reduction gear train 75 of the simpler transmission actuating mechanism 60 and the shift motor 61 are supported on the extension support wall 71 that extends rearward from the right side wall $31D_R$ of the lower crankcase member 31D on which the drum turning shaft 81 of the shift drum 80, with the driven gear 83 mounted thereon, is rotatably supported. Consequently, the transmission actuating mechanism 60 is placed all together on the right side wall $31D_R$ and the extension support wall 71, so that the transmission apparatus 4 is prevented from being enlarged and the vehicle power unit P is made small in size.

The speed reduction gear train 75 for transmitting power from the drive gear 62 to the driven gear 83, and is arranged in an area spaced apart from the transmission 40 and along the right side surfaces, lying substantially flush with each other, of the right side wall $31D_R$ and the vertical wall $71_C$ of the extension support wall 71. The speed reduction gear train 75 is also supported on the extension support wall 71 and the right side wall $31D_R$ and is arranged in a longitudinal array. Therefore, the shift motor 61 that has the drive gear 62 in the rearmost position in the speed reduction gear train 75 is spaced from the transmission 40 and disposed in a rear portion of the lower crankcase member 31D.

The idle gear 79I is included in the speed reduction gear train 75 that is arranged in a longitudinal array. Therefore, the speed reduction ratios of the speed reduction gear train 75 remain unchanged. The idle gear 79I included in the speed reduction gear train 75 allows the shift motor 61 to be spaced from the transmission 40 and disposed in the rear portion of the lower crankcase member 31D out of physical interference with the transmission 40, and does not delay changing gear positions.

FIG. 2 illustrates an oil level line Lo of oil kept in the oil pan 37 and the lower crankcase member 31D.

The speed reduction gear train 75 is disposed above the oil level line Lo.

Because the speed reduction gear train 75 is disposed above the oil level line Lo, an adverse effect that friction due to the oil has on the speed reduction gear train 75 is reduced, making it possible to increase the ability of the transmission actuating mechanism 60 to control gear shifting in the transmission 40.

In the embodiment illustrated above, the speed reduction ratio of the speed reduction gear train 75 in the transmission actuating mechanism 60 is 33.4, and the transmission actuating mechanism 60 can stop the shift drum 80 easily at desired angular positions in the absence of an intermittent feed mechanism and the stopper mechanism 90. However, it is difficult to dispense with the stopper mechanism 90 if the speed reduction ratio of the speed reduction gear train 75 is lower than 23.

Figure 9:
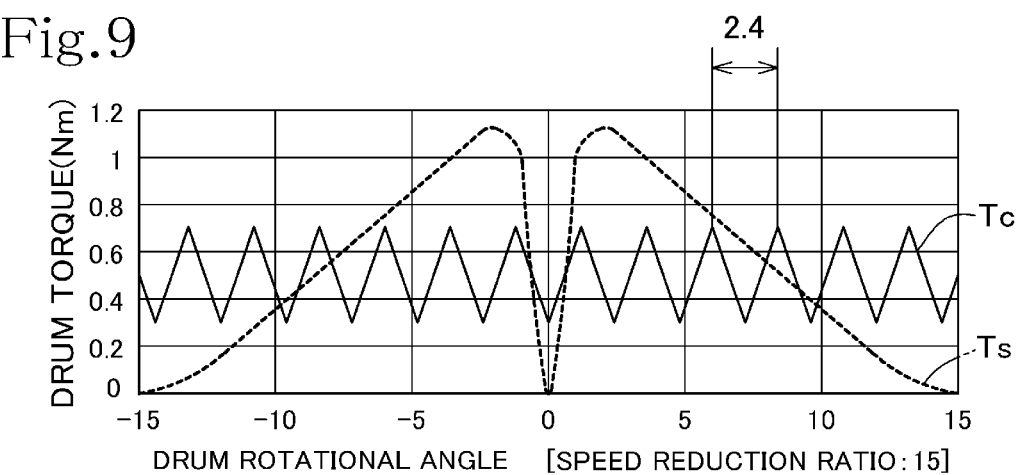
FIG. 9 is a graph illustrating cogging torque changes acting on the shift drum in case the speed reduction ratio of the speed reduction gear train is 15.

FIG. 9 is a graph illustrating cogging torque Tc changes acting on the shift drum 80 with respect to the angular displacement of the shift drum 80, at the time the shift drum 80 is angularly moved by the shift motor 61 according to the above embodiment through the speed reduction gear train 75 whose speed reduction ratio is approximately 15. As illustrated in FIG. 9, the cogging torque Tc acting on the shift drum 80 with this arrangement has a maximum value of approximately 0.7 Nm, that is lower than the maximum value of approximately 1.15 Nm of the stopper torque Ts.

Since the cogging torque Tc produced by the shift motor 61 cannot perform a positioning function of a stopper mechanism, the transmission actuating mechanism requires the stopper mechanism 90 as indicated by the two-dot-dash lines in FIGS. 5 and 6.

However, the transmission actuating mechanism 60 can dispense with an intermittent feed mechanism that has heretofore been necessary. Accordingly, the transmission actuating mechanism 60 may be made up of a reduced number of parts and simpler in structure, so that the transmission apparatus 4 is prevented from being enlarged and the vehicle power unit P is made small in size.

The transmission actuating mechanism 60 that is free of an intermittent feed mechanism is free of noise that would otherwise be caused by an intermittent feed mechanism in changing gear positions and hence does not require a soundproof structure.

Figure 10:
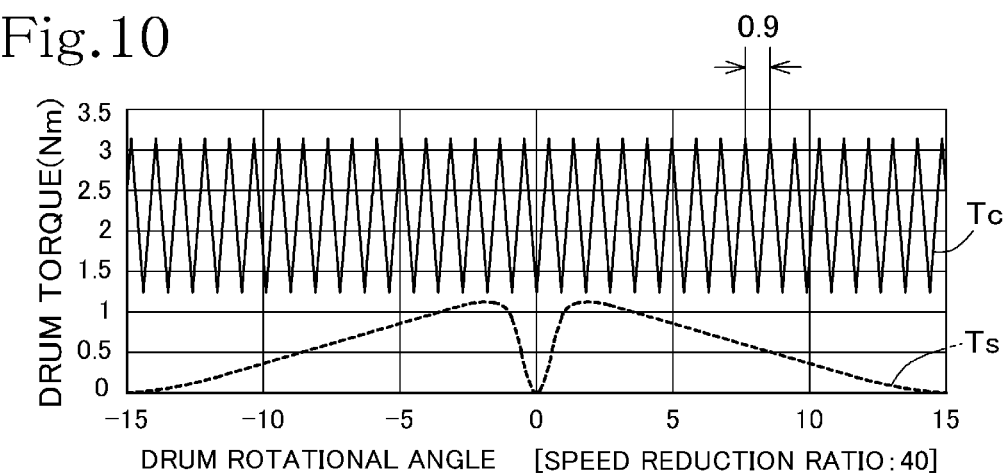
FIG. 10 is a graph illustrating cogging torque changes acting on the shift drum in case the speed reduction ratio of the speed reduction gear train is 40.

FIG. 10 is a graph illustrating changes in cogging torque Tc acting on the shift drum 80 with respect to the angular displacement of the shift drum 80 at the time the shift drum 80 is angularly moved by the shift motor through the speed reduction gear train 75 whose speed reduction ratio is larger, e.g., approximately 40.

The used shift motor is the shift motor 61 according to the above embodiment

As illustrated in FIG. 10, the cogging torque Tc acting on the shift drum 80 has a maximum value of 3.2 Nm that is much higher than the maximum value of approximately 1.15 Nm of the stopper torque Ts. Consequently, the cogging torque Tc produced by the shift motor 61 can perform a positioning function of a stopper mechanism. The transmission actuating mechanism 60 requires no stopper mechanism and no intermittent feed mechanism, and therefore, the transmission actuating mechanism 60 produces a shift drum adjustment torque in an appropriate range.

The larger the speed reduction ratio of the speed reduction gear train, the slower it is for the transmission to change gear positions.

If the speed reduction ratio of the speed reduction gear train exceeds 45, then it takes time for the transmission gears to move. Therefore, it is time-consuming to change gear positions, making it difficult for the dog clutches to mesh smoothly.

Accordingly, the shift motor is required to be larger in size and higher in output power.

Small-sized shift motors produce cogging torques Tc having a maximum value of approximately 0.05 Nm. If the maximum value of the cogging torque Tc is smaller than 0.04 Nm, then the shift motor finds it difficult to position or stop the shift drum. If the maximum value of the cogging torque Tc produced by a shift motor exceeds 0.07 Nm, then the shift motor is unable to rotate smoothly and tends to be large and heavy.

A vehicle power unit P according to another embodiment of the present invention will be described below with reference to FIGS. 11 through 13.

The vehicle power unit P is mounted on a motorcycle and includes an internal combustion engine 103 oriented laterally such that it has a crankshaft 132 whose axis of rotation is oriented leftward and rightward directions transversely across the vehicle body frame.

The internal combustion engine 103 is a water-cooled, four-cylinder, four-stroke cycle internal combustion engine.

The internal combustion engine 103 includes a crankcase 131 on which the crankshaft 132 is rotatably supported. The internal combustion engine 103 also includes a cylinder block 134 and a cylinder head 135 successively stacked on the crankcase 131 along a cylinder axis that is inclined slightly forward. The cylinder head 135 has an upper surface covered with a cylinder head cover 136.

The vehicle power unit P also includes a transmission apparatus 104 having a transmission 140 integrally housed in a rear portion of the crankcase 131 of the internal combustion engine 103.

Figure 11:
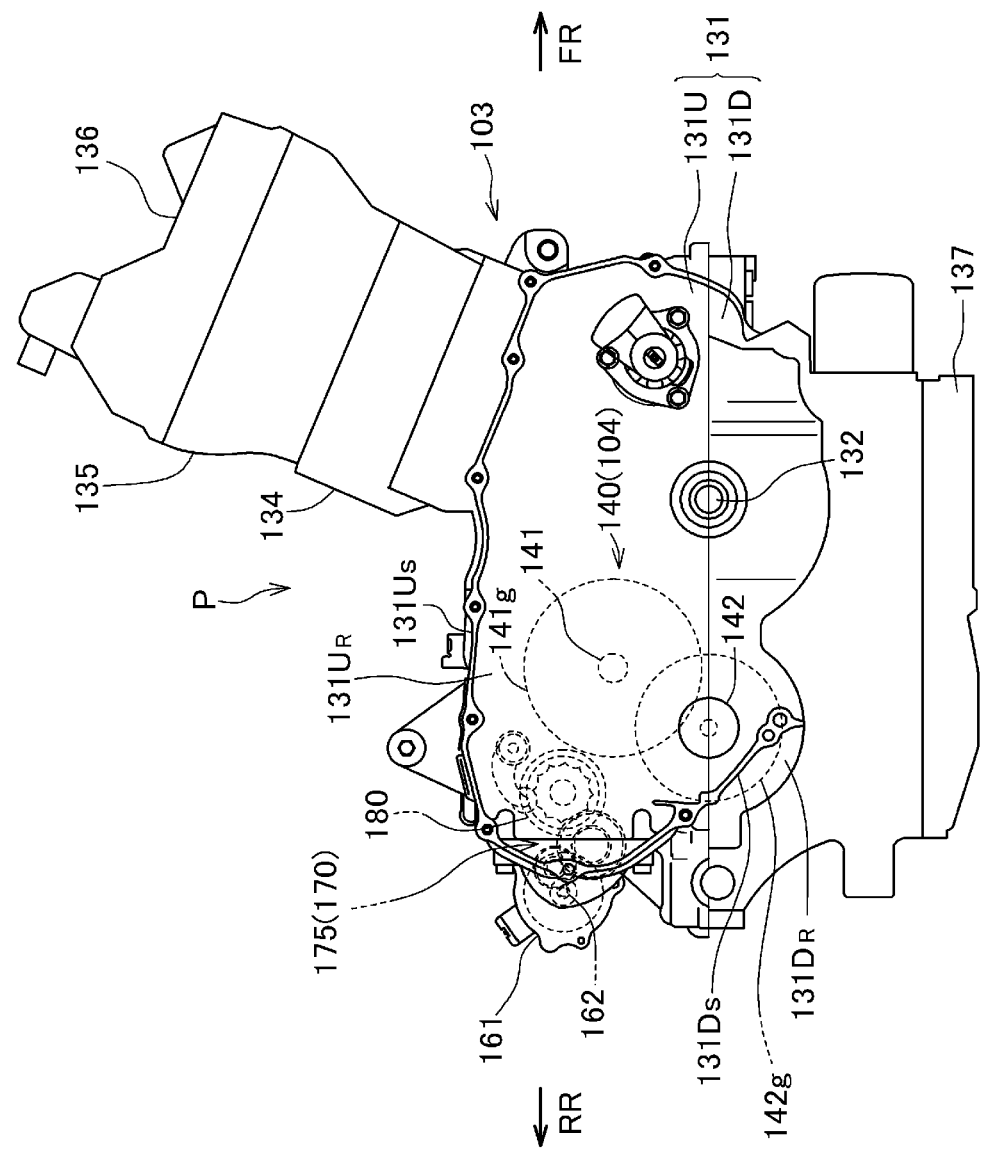
FIG. 11 is a right side elevational view of a vehicle power unit according to another embodiment of the present invention.

As illustrated in FIG. 11, the crankcase 131 is of a vertically split structure including an upper crankcase member 131U and a lower crankcase member 131D.

As illustrated in FIG. 11, the crankshaft 132 is rotatably supported on the mating surfaces of left and right bearing walls of the upper crankcase member 131U and the lower crankcase member 131D. The transmission 140 includes a main shaft 141 and a countershaft 142 that are oriented in the leftward and rightward directions. The countershaft 142 is also rotatably supported on the mating surfaces of left and right bearing walls of the upper crankcase member 131U and the lower crankcase member 131D, rearward of the crankshaft 132.

The main shaft 141 of the transmission 140 is rotatably supported on a left side wall $131U_L$ and a right side wall $131U_R$ of the upper crankcase member 131U, upward and slightly forward of the countershaft 142.

The transmission 140 also includes a group of transmission drive gears 141g rotatably supported on the main shaft 141 and a group of transmission driven gears 142g rotatably supported on the countershaft 142. The drive and drive gears 141g and 142g are normally held in mesh with each other in respective pairs at corresponding speed reduction ratios, in a similar way as shown in FIG. 4.

The countershaft 142 serves as an output shaft of the vehicle power unit P and has a left end portion projecting to the left through the left bearing walls.

Figure 12:
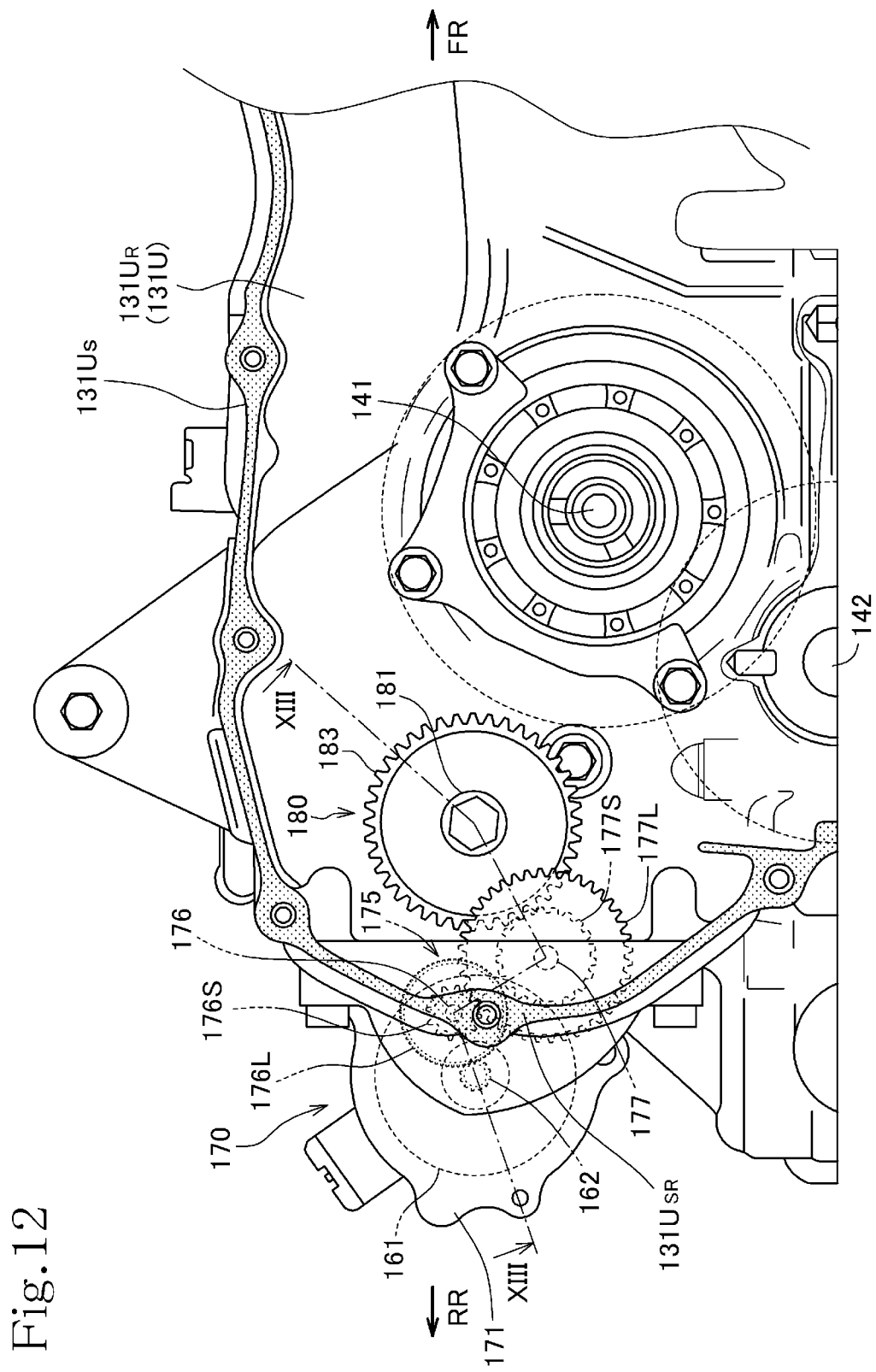
FIG. 12 is a fragmentary right side elevational view, partly omitted from illustration, of the vehicle power unit illustrated in FIG. 11.
Figure 13:
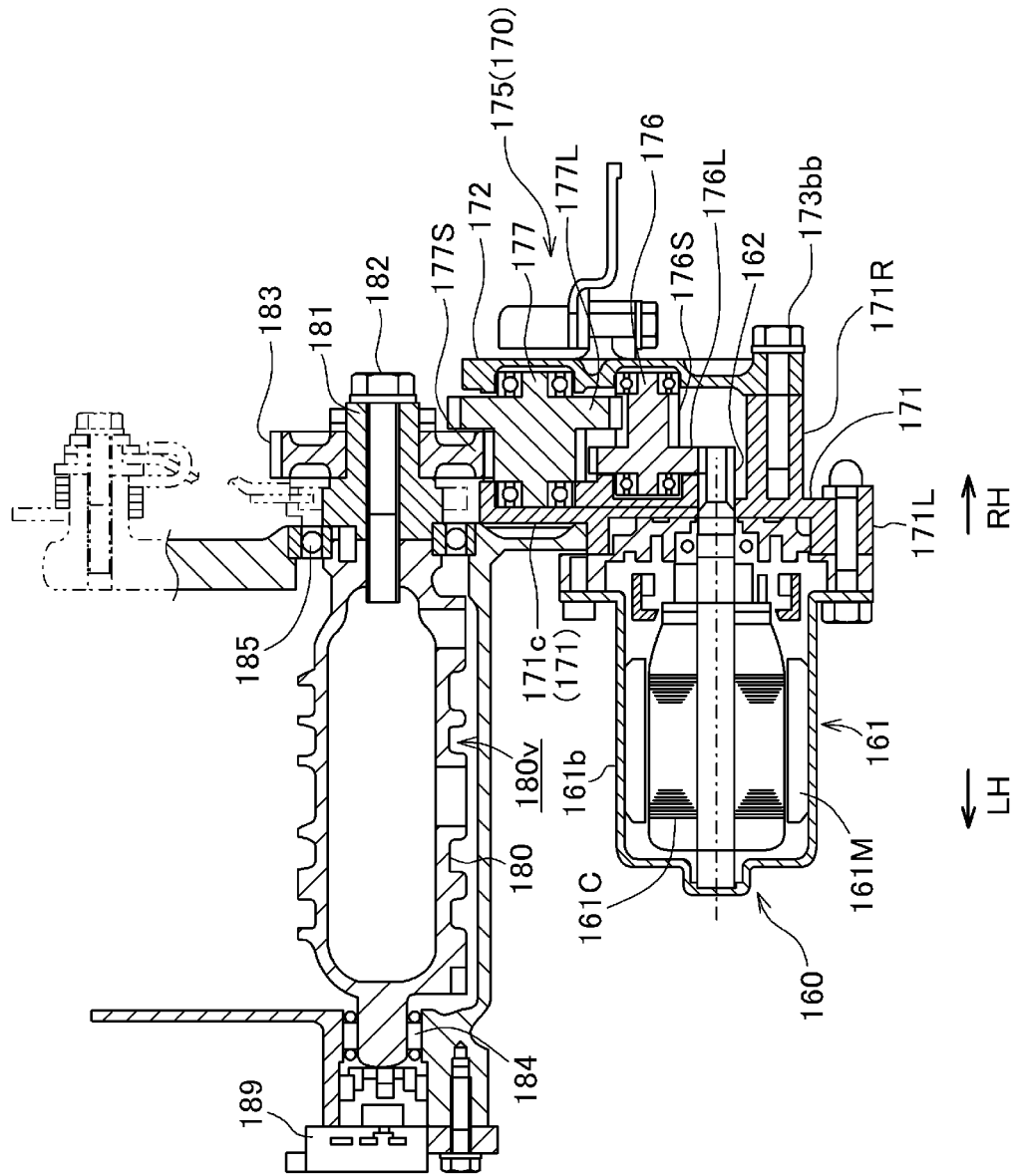
FIG. 13 is a sectional development view of a portion of the vehicle power unit, taken alone line XIII-XIII of FIG. 12.

As illustrated in FIGS. 12 and 13, a transmission actuating mechanism 160 for selecting a gear position in the transmission 140 includes a shift motor 161, a speed reduction gear mechanism 170, and a shift drum 180.

The shift drum 180 is disposed rearward and slightly obliquely upward of the main shaft 141 and extends parallel to the main shaft 141. The shift drum 180 has a left end portion rotatably supported on the left side wall $131U_L$ of the upper crankcase member 131U by a needle bearing 184, and a right end portion rotatably supported on the right side wall $131U_R$ of the upper crankcase member 131U by a ball bearing 185.

A drum angular displacement sensor 189 for detecting the angular displacement of the shift drum 180 is disposed at a left shaft portion of the shift drum 180 that extends through the needle bearing 184.

A drum turning shaft 181 is fastened coaxially to the right end of the shift drum 180 by a bolt 182. The junction portion between the drum turning shaft 181 and the shift drum 180 is rotatably supported on the right side wall $131U_R$ by the ball bearing 185.

A driven gear 183 is fitted over the drum turning shaft 181 that extends rightwardly through the right side wall $131U_R$ around the right end of the shift drum 180.

The speed reduction gear mechanism 170 is mounted on a rear surface of a right rear peripheral wall $131U_{SR}$, behind the right side wall $131U_R$, of an upper peripheral wall $131U_S$ of the upper crankcase member 131U.

As illustrated in FIGS. 12 and 13, the speed reduction gear mechanism 170 has an extension support wall 171 mounted on the right rear peripheral wall $131U_{SR}$. The extension support wall 171 is disposed behind the right side wall $131U_R$ of the upper crankcase member 131U and extends such that a front portion thereof is superposed on the right side wall $131U_R$.

The extension support wall 171 includes a vehicle-longitudinally elongate vertical wall $171_C$ extending rearward from the right side wall $131U_R$, a vehicle-longitudinally elongate annular frame wall $171_R$ extending rightward from the vertical wall $171_C$, and an annular frame wall $171_L$ extending leftward from a rear portion of the vertical wall $171_C$ that projects rearward from the annular frame wall $171_R$.

As illustrated in FIG. 12, the extension support wall 171 has a front end portion held against the rear surface of the right rear peripheral wall $131U_{SR}$ of the upper peripheral wall $131U_S$ of the upper crankcase member 131U. Upper and lower brackets on a front portion of the annular frame wall $171_R$ of the extension support wall 171 are fastened respectively to mount bosses on the right rear peripheral wall $131U_{SR}$ by respective bolts.

With the extension support wall 171 being mounted on the right rear peripheral wall $131U_{SR}$ of the upper crankcase member 131U, as illustrated in FIG. 13, a right side surface of the right side wall $131U_R$ and a right side surface of the vertical wall 171 lie substantially flush with each other, in the same manner as illustrated in FIG. 6.

The shift motor 161 is mounted on the annular frame wall $171_L$ that is disposed on the left side of the rear portion of the extension support wall 171. The shift motor 161 has a small-diameter drive gear 162 on its output shaft that projects to the right from the right side surface of the vertical wall $171_C$.

The small-diameter drive gear 162 extends rightward through the vertical wall $171_C$ into the space defined by the annular frame wall $171_R$.

As illustrated in FIG. 13, the shift motor 161 includes a motor casing 161b disposed on the left side of the vertical wall $171_C$ and the right side wall $131U_R$ and on the right side of the left side wall $131U_L$.

Specifically, the motor casing 161b of the shift motor 161 is disposed between the left side wall $131U_L$ and the right side wall $131U_R$ of the upper crankcase member 131U, i.e., is positioned within the transverse width of the crankcase 131 without projecting transversely out of the crankcase 131. The shift motor 161 is thus disposed in a compact layout.

As the extension support wall 171 is mounted on the upper crankcase member 131U of the vertically split crankcase 131, the shift motor 161 that is mounted on the extension support wall 171 is disposed on a rear portion of the upper crankcase member 131U and hence is protected from pebbles hurtling toward the shift motor 161.

The driven gear 183 is fitted over the drum turning shaft 181 that is joined to the right end of the shift drum 180 and positioned rightward of the right side wall $131U_R$. The drive gear 162 of the shift motor 161 mounted on the vertical wall $171_C$ of the extension support wall 171 extends to the right through the vertical wall $171_C$ whose right side surface lies flush with the right side surface of the right side wall $131U_R$. The driven gear 183 and the drive gear 162 are arranged along the right side surfaces, which lie flush with each other, of the right side wall $131U_R$ and the vertical wall $171_C$.

A speed reduction gear train 175 that transmits power from the drive gear 162 to the driven gear 183 is supported on the extension support wall 171 and the right side wall $131U_R$ and is arranged in a longitudinal array.

Specifically, the speed reduction gear train 175 is disposed in the space defined by the annular frame wall $171_R$ that extends to the right from the vertical wall $171_C$ of the extension support wall 171. The annular frame wall $171_R$ has a right opening covered with a cover 172 (see FIG. 13).

The cover 172 has a peripheral mating surface held against an open end face of the annular frame wall $171_R$ and is fastened to the annular frame wall $171_R$ by a plurality of bolts 173bb spaced apart along the peripheral mating surface of the cover 172. The annular frame wall $171_R$ and the cover 172 jointly define a gear chamber that houses the speed reduction gear train 175 therein.

The speed reduction gear train 175, which has three speed reduction stages, includes two gear shafts 176 and 177 oriented transversely in leftward and rightward directions and have both ends rotatably supported on the vertical wall $171_C$ of the extension support wall 171 and on the cover 172.

The two gear shafts 176 and 177 will be referred to as first and second gear shafts 176 and 177. A large-diameter gear 176L and a small-diameter gear 176S are integral with the first gear shaft 176 that is positioned in a rear position. A large-diameter gear 177L and a small-diameter gear 177S are integral with the second gear shaft 177 that is positioned obliquely forward and downward of the first gear shaft 176.

The small-diameter drive gear 162 of the shift motor 161 that projects to the right from the right side surface of the vertical wall 171c is held in mesh with the large-diameter gear 176L of the first gear shaft 176, providing a first speed reduction stage R1. The small-diameter gear 176S of the first gear shaft 176 is held in mesh with the large-diameter gear 177L of the second gear shaft 177, providing a second speed reduction stage R2. The small-diameter gear 177S of the second gear shaft 177 is held in mesh with the driven gear 183, providing a third speed reduction stage R3.

The speed reduction gear train 175 thus has three speed reduction stages including the first, second, and third speed reduction stages R1, R2, and R3.

The large-diameter gear 177L and the small-diameter gear 177S of the second gear shaft 77 extend into a space inside of the lower peripheral wall $131D_S$ through an opening defined in a front wall portion of the annular frame wall $171_R$ of the extension support wall 171 and through an opening defined in the right rear peripheral wall $131U_{SR}$ of the upper peripheral wall $131U_S$ of the upper crankcase member 131U.

The small-diameter gear 78S of the third gear shaft 178 is held in mesh with the driven gear 83 fitted over the drum turning shaft 81 integral with the shift drum 80.

Therefore, rotation of the drive gear 162 of the shift motor 161 is reduced in speed by the three speed reduction stages, i.e., the first, second, and third speed reduction stages R1, R2, and R3, of the speed reduction gear train 175, and transmitted to the driven gear 183, thereby angularly moving the shift drum 180 integral with the driven gear 183.

When the shift drum 180 is angularly moved, shift forks 187 are guided by lead grooves 180v defined in an outer circumferential surface of the shift drum 180 to move axially, axially moving shifter gears of the transmission 40 to change gear positions of the transmission 140.

The numbers of the gear teeth of the drive gear 162, the large-diameter gear 176L, the small-diameter gear 176S, the large-diameter gear 177L, the small-diameter gear 177S, and the driven gear 183 of the speed reduction gear train 175 are 11, 45, 10, 33, 17, and 42, respectively.

The first speed reduction stage R1 has a speed reduction ratio of approximately 4.1 (=45/11), the second speed reduction stage R2 has a speed reduction ratio of approximately 3.3 (=33/10), and third speed reduction stage R3 has a speed reduction ratio of approximately 2.5 (=42/17). The speed reduction gear train 175 has an overall speed reduction ratio of approximately 33.4.

The shift motor 161 is a DC commutator electric motor with a permanent-magnet field. The shift motor 161 includes ten coils 161C arrayed circumferentially on a rotor thereof and ten permanent magnets 161M arrayed circumferentially on a stator thereof that is disposed around the rotor.

A cogging torque produced by the shift motor 161 when magnetic forces from the permanent magnets 161M act on the cores of the coils 161C with no electric current flowing through the coils 161C, has a maximum value of approximately 0.052 Nm.

In the transmission actuating mechanism 160 described above, cogging torque changes acting on the shift drum 180 with respect to the angular displacement of the shift drum 180 at the time the shift drum 180 is angularly moved by the shift motor 161 through the speed reduction gear train 175 whose speed reduction ratio is approximately 33.4 are illustrated in FIG. 8.

As illustrated in FIG. 8, the cogging torque Tc has the maximum value of approximately 1.74 Nm which is higher than the maximum value of approximately 1.15 Nm of the stopper torque Ts.

Therefore, the transmission actuating mechanism 160 that includes the shift motor 161 and the speed reduction gear train 175 has the same positioning function as the stopper mechanism on account of the cogging torque Tc acting on the shift drum 180, and hence makes the stopper mechanism redundant.

The transmission actuating mechanism 160 also does not need an intermittent feed mechanism that has heretofore been necessary. Without an intermittent feed mechanism, the transmission actuating mechanism 160 is able to brake the shift drum 180 effectively with the cogging torque applied from the shift drum 180 through the speed reduction gear train 175, minimizing an overshoot of the shift drum 180 to stop the shift drum 180 accurately at a target angle.

The transmission actuating mechanism 160 that is free of an intermittent feed mechanism is free of noise that would otherwise be caused by an intermittent feed mechanism in changing gear positions and hence does not require a soundproof structure.

As described above, the transmission actuating mechanism 160 can stop the shift drum 180 easily in desired angular positions in the absence of an intermittent feed mechanism and a stopper mechanism. Accordingly, the transmission actuating mechanism 160 may be made up of a reduced number of parts, simpler in structure, and less costly to manufacture.

In addition, as rotation of the shift motor 161 is transmitted to the shift drum 180 to angularly move the shift drum 180 only through the speed reduction gear train 175, the transmission 140 is capable of changing gear positions more quickly and smoothly with an electric motor.

If the speed reduction ratio of the speed reduction gear train 175 is lower than 23, then the maximum value of the cogging torque Tc acting on the shift drum 180 is lower than the maximum value of approximately 1.15 Nm of the stopper torque Ts, making it difficult to dispense with the stopper mechanism.

The vehicle power units P according to the two embodiments of the present invention have been described above. The present invention is not limited to the above illustrated embodiments, and various changes and modifications may be made therein without departing from the scope of the invention.

The extension support walls 71 and 171 that support the speed reduction gear trains 75 and 175 are separate from the crankcases 31 and 131, and are disposed in such positions that they extend rearward from the right side walls $31D_R$ and $131U_R$ of the crankcases 31 and 131. However, an extension support wall may actually extend integrally from a right side wall of a crankcase, so that the extension support wall may be integral with the crankcase.

REFERENCE SIGNS LIST

P . . . vehicle power unit, m1 to m6 . . . drive gear, c1 to c6 . . . driven gear, m3, m4, c5, c6 . . . shifter gear,
1 . . . motorcycle, 3 . . . internal combustion engine,
4 . . . transmission apparatus, 10 ... vehicle body frame, 11 ... head pipe, 12 ... main frame, 13 ... central frame, 14 ... seat rail, 15 ... middle stay, 16 ... down frame, 17 ... front fork, 19 ... steering handle, 20 ... pivot shaft, 23 ... rear wheel, 24 ... rider's seat, 25 ... fuel tank,
31 ... crankcase, 31U ... upper crankcase member, $31U_L$ ... left side wall, $31U_R$ ... right side wall, $31U_S$ ... upper peripheral wall, 31D ... lower crankcase member, $31D_L$ ... left side wall, $31D_R$ ... right side wall, $31D_S$ ... lower peripheral wall, $31D_{SR}$ ... right rear peripheral wall, 32 ... crankshaft, 33 ... primary drive gear, 34 ... cylinder block, 35 ... cylinder head, 36 ... head cover, 37 ... oil pan, 38R ... right crankcase cover, 38L ... left crankcase cover,
40 ... transmission, 41 ... main shaft, 42 ... countershaft, 43 ... ball bearing, 44 ... ball bearing, 45 ... ball bearing, 46 ... ball bearing, 47 ... needle bearing,
50 ... gear group, 51 ... dog clutch, 52 ... fork groove, 53 ... clutch mechanism, 54 ... primary driven gear, 55 ... hydraulic circuit,
60 ... transmission actuating mechanism, 61 ... shift motor, 61b ... motor casing, 62 ... drive gear,
70 ... speed reduction gear mechanism, 71 ... extension support wall, $71_C$ ... vertical wall, $71_L$ ... annular frame wall, $71_R$ ... annular frame wall, 72 ... cover, 73ba, 73bb, 73bc ... bolt, 75 ... speed reduction gear train, 76 ... first gear shaft, 76L ... large-diameter gear, 76S ... small-diameter gear, 77 ... second gear shaft, 77L ... large-diameter gear, 77S ... small-diameter gear, 78 ... third gear shaft, 78L ... large-diameter gear, 79 ... idle gear shaft, 79I ... idle gear,
80 ... shift drum, 80d ... recess, 81 ... drum turning shaft, 82 ... bolt, 83 ... driven gear, 84 ... needle bearing, 85 ... ball bearing, 86 ... shift fork shaft, 87 ... shift fork, 88 ... neutral switch, 88s ... detection rod, 89 ... drum angular displacement sensor,
90 ... stopper mechanism, 91 ... star-shaped cam, 92 ... stopper arm, 93 ... stopper roller,
95 ... shift drum, 95d ... recess, 97 ... neutral switch, 97s ... detection rod, 98 ... spring,
103 ... internal combustion engine, 104 ... transmission apparatus,
131 ... crankcase, 131U ... upper crankcase member, $131U_L$ ... left side wall, $131U_R$ ... right side wall, $131U_S$ ... upper peripheral wall, $131U_{SR}$ ... right rear peripheral wall, 131D ... lower crankcase member, 132 ... crankshaft,
140 ... transmission, 141 ... main shaft, 142 ... countershaft,
160 ... transmission actuating mechanism, 161 ... shift motor, 161b ... motor casing, 162 ... drive gear,
170 ... speed reduction gear mechanism, 171 ... extension support wall, $171_C$ ... vertical wall, $171_L$ ... annular frame wall, $171_R$ ... annular frame wall, 172 ... cover, 175 ... speed reduction gear train, 176 ... first gear shaft, 176L ... large-diameter gear, 176S ... small-diameter gear, 177 ... second gear shaft, 177L ... large-diameter gear, 177S ... small-diameter gear,
180 ... shift drum, 181 ... drum turning shaft, 182 ... bolt, 183 ... driven gear, 189 ... drum angular displacement sensor.

The invention claimed is:

1. A vehicle power unit having an internal combustion engine and a transmission apparatus integrally supported in a crankcase, the transmission apparatus including a transmission having gear pairs of different speed reduction ratios for transmitting power from the internal combustion engine to a vehicle, and a transmission actuating mechanism having a shift drum angularly movable by a shift motor to move shift forks guided by the shift drum for changing gear pairs of the transmission to transmit power, wherein:

a speed reduction gear train has multiple speed reduction stages for transmitting power from a drive gear, on a drive shaft of the shift motor, to a driven gear on a drum turning shaft of the shift drum;

a shift drum adjustment torque, for angularly moving the shift drum from a 0-degree angular position to change gear positions, is set to be 1.15 Nm or larger, the shift drum adjustment torque being provided primarily by the shift motor and the speed reduction gear train without a star-shaped cam, the speed reduction gear train has a speed reduction ratio ranging from 23 to 45; and the shift motor includes a direct current electric motor which produces a pulsating cogging torque having a maximum value in a range from 0.04 to 0.07 Nm.

2. The vehicle power unit as claimed in claim 1, wherein:

the vehicle power unit is configured to be laterally mounted on a small-sized vehicle with a crankshaft oriented in leftward and rightward directions transversely across the small-size vehicle;

the shift drum has left and right drum turning shafts rotatably supported respectively on left and right side walls of the crankcase;

the driven gear is mounted on one of the left and right drum turning shafts of the shift drum;

the transmission actuating mechanism includes an extension support wall extending rearward from one of the left and right side walls of the crankcase, the one of the left and right side walls rotatably supporting the one of the left and right drum turning shafts with the driven gear mounted thereon;

the shift motor is mounted on the extension support wall with the drive gear protrusively disposed in the leftward and rightward directions; and the speed reduction gear train is supported on the extension support wall and arranged in an array.

3. The vehicle power unit as claimed in claim 2, wherein:

the shift motor is mounted on a rear portion of the extension support wall with the drive gear protrusively disposed in one of the leftward and rightward directions which is the same as the direction in which the one of the left and right drum turning shafts with the driven gear mounted thereon extends.

4. The vehicle power unit as claimed in claim 3, wherein:

the crankcase is of a vertical split structure including an upper crankcase member and a lower crankcase member; and the extension support wall is mounted on the lower crankcase member.

5. The vehicle power unit as claimed in claim 4, wherein:

the speed reduction gear train is arrayed longitudinally of the vehicle between the drive gear and the driven gear.

6. The vehicle power unit as claimed in claim 5, wherein:

the speed reduction gear train includes an idle gear.

7. The vehicle power unit as claimed in claim 6, wherein:

the speed reduction gear train is disposed above an oil level line of oil kept in the lower crankcase member.

8. The vehicle power unit as claimed in claim 6, wherein:
an endless chain is trained around a drive sprocket fitted over an output shaft of the vehicle power unit and a driven sprocket fitted over a rear axle; and
the shift motor is disposed transversely inwardly of the endless chain at a position superposed on the endless chain as viewed in side elevation.

9. The vehicle power unit as claimed in claim 5, wherein:
the speed reduction gear train is disposed above an oil level line of oil kept in the lower crankcase member.

10. The vehicle power unit as claimed in claim 5, wherein:
an endless chain is trained around a drive sprocket fitted over an output shaft of the vehicle power unit and a driven sprocket fitted over a rear axle; and
the shift motor is disposed transversely inwardly of the endless chain at a position superposed on the endless chain as viewed in side elevation.

11. The vehicle power unit as claimed in claim 4, wherein:
the speed reduction gear train is disposed above an oil level line of oil kept in the lower crankcase member.

12. The vehicle power unit as claimed in claim 11, wherein:
an endless chain is trained around a drive sprocket fitted over an output shaft of the vehicle power unit and a driven sprocket fitted over a rear axle; and
the shift motor is disposed transversely inwardly of the endless chain at a position superposed on the endless chain as viewed in side elevation.

13. The vehicle power unit as claimed in claim 4, wherein:
an endless chain is trained around a drive sprocket fitted over an output shaft of the vehicle power unit and a driven sprocket fitted over a rear axle; and
the shift motor is disposed transversely inwardly of the endless chain at a position superposed on the endless chain as viewed in side elevation.

14. The vehicle power unit as claimed in claim 3, wherein:
the crankcase is of a vertical split structure including an upper crankcase member and a lower crankcase member; and
the extension support wall is mounted on the upper crankcase member.

15. The vehicle power unit as claimed in claim 1, wherein the shift motor comprises a motor casing which is aligned with the crankcase in a manner so as to be positioned within a transverse width of the crankcase without projecting transversely out beyond the crankcase.

16. A vehicle power unit having an internal combustion engine and a transmission apparatus integrally supported in a crankcase,
the transmission apparatus including a transmission having gear pairs of different speed reduction ratios for transmitting power from the internal combustion engine to a vehicle, and a transmission actuating mechanism having a shift drum angularly movable by a shift motor to move shift forks guided by the shift drum for changing gear pairs of the transmission to transmit power, wherein:
a speed reduction gear train has multiple speed reduction stages for transmitting power from a drive gear on a drive shaft of the shift motor to a driven gear on a drum turning shaft of the shift drum;
the speed reduction gear train has a speed reduction ratio ranging from 23 to 45;
a shift drum adjustment torque, for angularly moving the shift drum from a 0-degree angular position to change gear positions, is provided primarily by the shift motor and the speed reduction gear train without a star-shaped cam;
the shift motor comprises a motor casing which is aligned with the crankcase in a manner so as to be positioned within a transverse width of the crankcase without projecting transversely out beyond the crankcase;
an endless chain is trained around a drive sprocket fitted over an output shaft of the vehicle power unit and a driven sprocket fitted over a rear axle;
the shift motor is disposed transversely inwardly of the endless chain at a position superposed on the endless chain as viewed in side elevation;
and the shift motor includes a direct current electric motor which produces a pulsating cogging torque having a maximum value in a range from 0.04 to 0.07 Nm.

* * * * *